US007620956B2

(12) United States Patent
Cook et al.

(10) Patent No.: US 7,620,956 B2
(45) Date of Patent: *Nov. 17, 2009

(54) PORTABLE MEMORY STORAGE DEVICES WITH APPLICATION LAYERS

(75) Inventors: Randall R. Cook, Springville, UT (US); Jared R. Blaser, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 1127 days.

This patent is subject to a terminal disclaimer.

(21) Appl. No.: 11/026,520

(22) Filed: Dec. 30, 2004

(65) Prior Publication Data

US 2005/0172279 A1  Aug. 4, 2005

Related U.S. Application Data

(63) Continuation-in-part of application No. 10/459,936, filed on Jun. 11, 2003, now Pat. No. 7,117,495.

(60) Provisional application No. 60/533,388, filed on Dec. 30, 2003.

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl. .......................... 719/313; 719/310; 707/8; 713/160

(58) Field of Classification Search ......... 719/311–320, 719/328–330, 310; 707/1–10, 200; 713/160–170
See application file for complete search history.

(56) References Cited

U.S. PATENT DOCUMENTS

| 5,313,646 | A |   | 5/1994  | Hendricks         |         |
|-----------|---|---|---------|-------------------|---------|
| 5,537,539 | A |   | 7/1996  | Narihiro          |         |
| 5,561,799 | A |   | 10/1996 | Khalidi           |         |
| 5,586,304 | A |   | 12/1996 | Stupek, Jr. et al.|         |
| 5,771,381 | A | * | 6/1998  | Jones et al.      | 713/100 |
| 5,905,990 | A |   | 5/1999  | Inglett           |         |
| 5,930,513 | A |   | 7/1999  | Taylor            |         |
| 5,933,647 | A |   | 8/1999  | Aronberg et al.   |         |
| 5,991,402 | A |   | 11/1999 | Jia               |         |
| 5,991,753 | A |   | 11/1999 | Wilde             |         |
| 6,161,218 | A |   | 12/2000 | Taylor            |         |
| 6,185,574 | B1|   | 2/2001  | Howard et al.     |         |
| 6,356,915 | B1|   | 3/2002  | Chtchetkine       |         |

(Continued)

OTHER PUBLICATIONS

Jeff Tranter, "CD-ROM and Linux", Linux Journal, Nov. 11, 1994. Retrieved from the Internet:<URL:http://www.linuxjournal.com/article/2851>.

(Continued)

*Primary Examiner*—Diem K Cao
(74) *Attorney, Agent, or Firm*—Advantedge Law Group

(57) ABSTRACT

The inventions relate generally to portable media storage devices that contain layers permitting applications to be used at a connected computing device, those systems optionally including drivers for operating a layered computing environment or a driver installation program. Also disclosed herein are computer systems for using other systems for creating those portable storage devices. Detailed information on various example embodiments of the inventions are provided in the Detailed Description below, and the inventions are defined by the appended claims.

17 Claims, 12 Drawing Sheets

U.S. PATENT DOCUMENTS

| | | | |
|---|---|---|---|
| 6,366,900 B1 | 4/2002 | Hu | |
| 6,374,402 B1 | 4/2002 | Schmeidler et al. | |
| 6,381,735 B1 | 4/2002 | Hunt | |
| 6,453,468 B1 | 9/2002 | D'Souza | |
| 2002/0157089 A1 | 10/2002 | Patel et al. | |
| 2002/0174215 A1 | 11/2002 | Schaefer | |
| 2002/0184184 A1* | 12/2002 | Holcomb | 707/1 |
| 2003/0033441 A1 | 2/2003 | Forin et al. | |
| 2003/0135522 A1* | 7/2003 | Doyle et al. | 707/200 |
| 2003/0158836 A1* | 8/2003 | Venkatesh et al. | 707/1 |
| 2007/0050620 A1* | 3/2007 | Pham et al. | 713/165 |
| 2008/0021907 A1* | 1/2008 | Patel et al. | 707/10 |

OTHER PUBLICATIONS

Jeff Tranter, "The Linux CD-ROM HOWTO", v.1.2, Aug. 21, 1994. Retreived from the Internet: <URL:http://www.ibiblio.org/pub/historic-linux/ftp-archives/sunsite.unc.edu/Nov-06-1994/docs/HOWTO/CDROM-HOWTO>.

ifs.5.1.tar.gz source code tarball, retrieved from the Internet:<URL:http://www.ibiblio.org/pub/historic-linux/ftp-archives/tsx-11.mit.edu/Oct-07-1996/ALPHA/ifs/>.

ovlfs1.0.src.tgz source code tarball, Mar. 11, 1998, retrieved from the Internet:<URL:http://www.ibiblio.org/pub/Linux/system/filesystems/>.

Newcomb, "Softricity has cure for app conflict blues", Thin Planet website, May 2002, parts 1 and 2, Jupitermedia Corp.

"SystemGuard", www.softricity.com website, Apr. 24, 2003 or earlier.

"SoftGrid for Windows Desktops Transforms Business Applications into Web-enabled services, reshaping the economics of enterprise . . . ", www.softricity.com website, Oct. 15, 2001.

"Softricity secures $14.6 million in oversubscribed third round venture funding", www.softricity.com website, Jul. 29, 2002.

"Microsoft and Softricity announce agreement to manage existing Windows applications with web services", www.softricity.com website, May 28, 2002.

"Softricity announces SoftGrid 2.0 first customer deployments and general availability", www.softricity.com website, May 6, 2002.

"Softricity unveils SoftGrid Dual-Mode", www.softricity.com website, Mar. 24, 2003.

"Softricity becomes premier member of Citrix Business Alliance", www.softricity.com website, Feb. 25, 2002.

"SoftGrid Sequencer", www.softricity.com website, Apr. 24, 2003 or earlier.

Longwell, "Softricity lowers price on Dual-Mode deployments", www.crn.com website, Mar. 28, 2003.

"Microsoft and Softricity announce agreement to manage existing Windows-based applications with Web services", a Microsoft website, May 28, 2002.

"Softricity Data Sheet: Softricity SystemGuard; The foundation for stable on-demand application access", www.softricity.com website, Feb. 2002.

"Softricity Data Sheet: Softricity SystemGuard; Softricity's patent-pending technology enables any application to run on any desktop . . . ", www.softricity.com website, Oct. 2002.

"Turning software into a service: there are no silver bullets", www.softricity.com website, Apr. 24, 2003 or earlier.

"Softricity acquires intellectual property of Seaport Software to extend virtual installation technology", www.choicesolutions.com website, Nov. 18, 2002.

"Softricity SoftGrid Platform: Softricity platform training guide", www.softricity.com website, Apr. 24, 2003 or earlier.

"Clean Slate", http://www.fortres.com/products/cleanslate.htm, Jan. 13, 2004.

"FAQ—2001013", http://www.fortres.com/support/faqviewarticle.asp?ID=2001013, Oct. 24, 2003.

"FAQ—2001014", http://www.fortres.com/support/faqviewarticle.asp?ID=2001014, Nov. 25, 2003.

"FAQ—2001015", http://www.fortres.com/support/faqviewarticle.asp?ID=2001015, Nov. 23, 2003.

"FAQ—2001025", http://www.fortres.com/support/faqviewarticle.asp?ID=2001025, Dec. 15, 2003.

Fortres Grand Corporation, "Computer Security Software—A Lifesaver for Schools", www.fortres.com, May/Jun. 2001 (presumed from presented article: periodical not available).

"Clean Slate FAQ", http://www.fortres.com/products/cleanslate_faq.htm, Jan. 13, 2004.

"Awards", http://www.fortres.com/products/awards.htm#cleanslate, Jan. 13, 2004.

Microsoft Windows NT Resource Kit, 1993, Microsoft Press, vol. 1, pp. 325-346.

Heidemann, J.S., File-System Development with Stackable Layers, Feb. 1994, ACM Transactions on Computer Systems, vol. 12, No. 1, pp. 58-89.

* cited by examiner

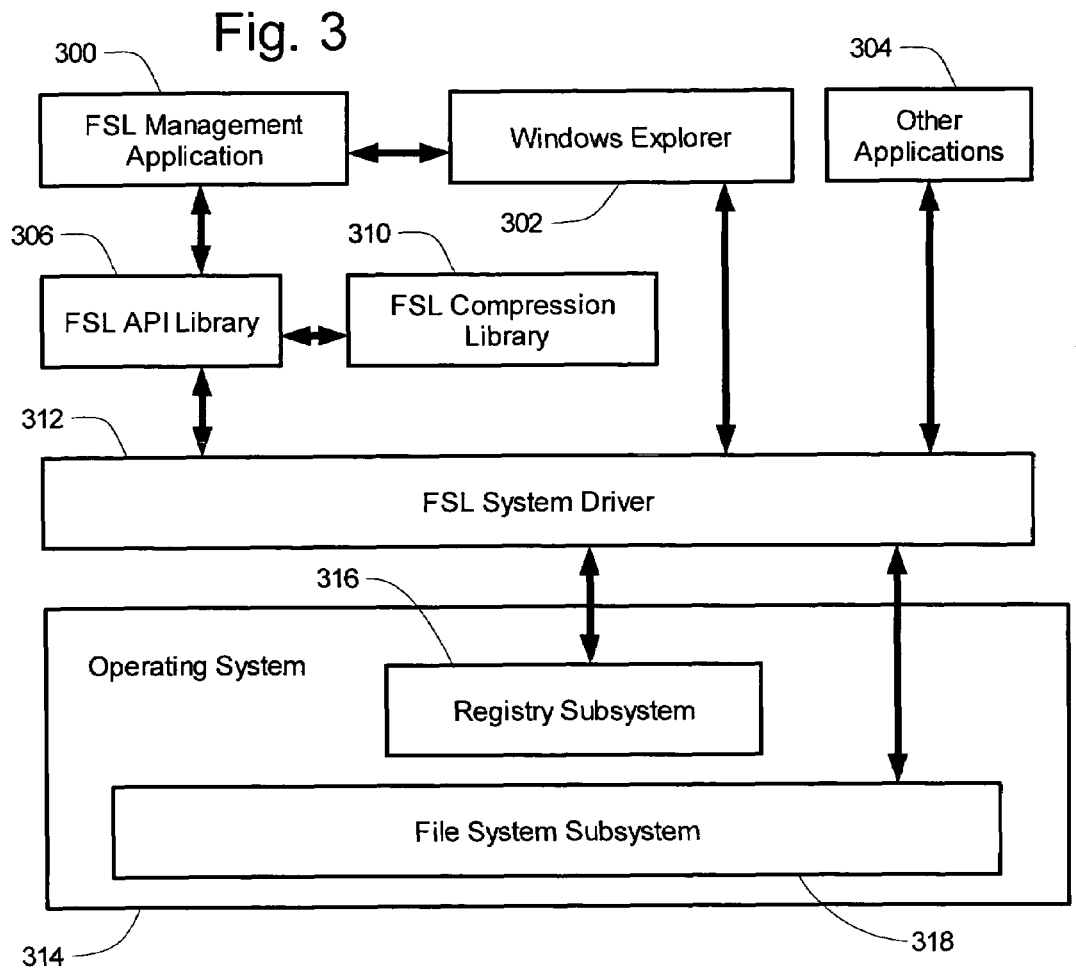
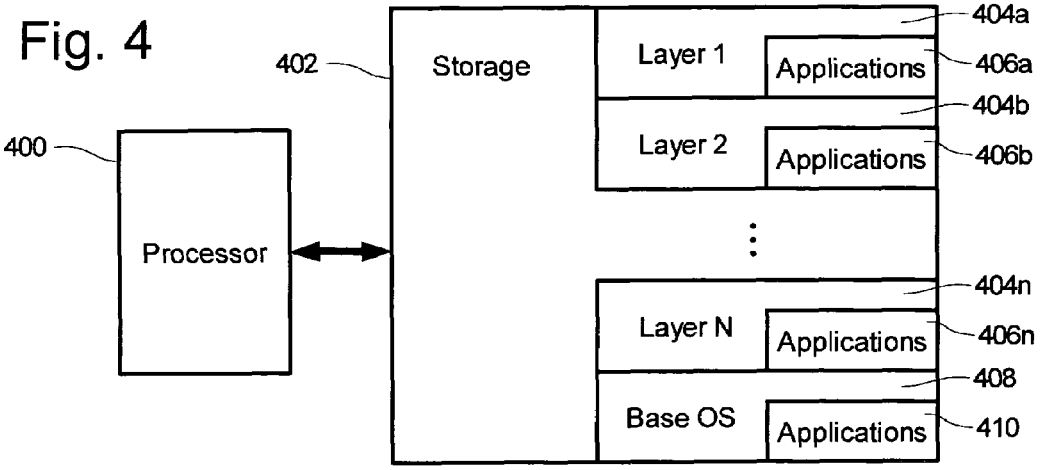

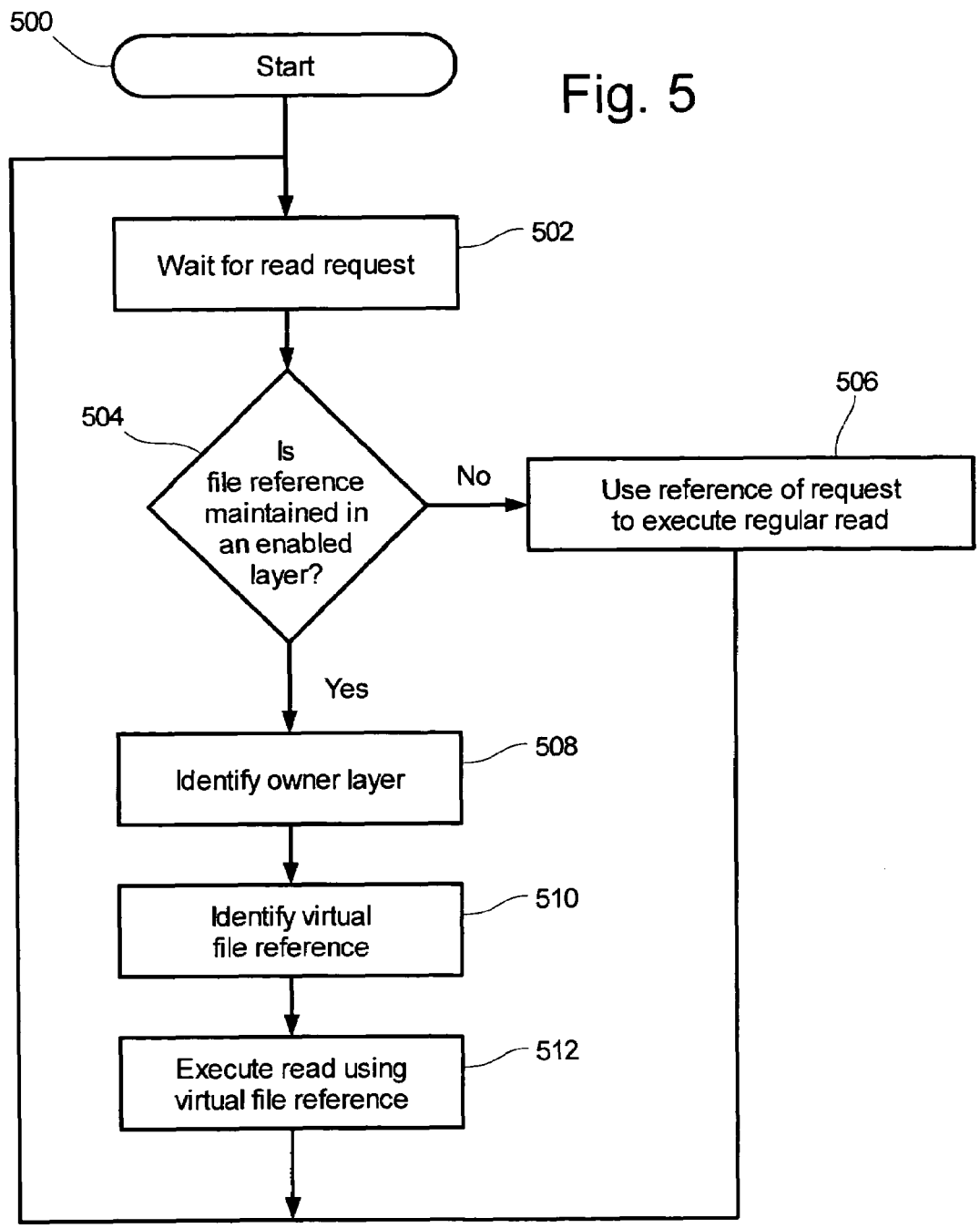

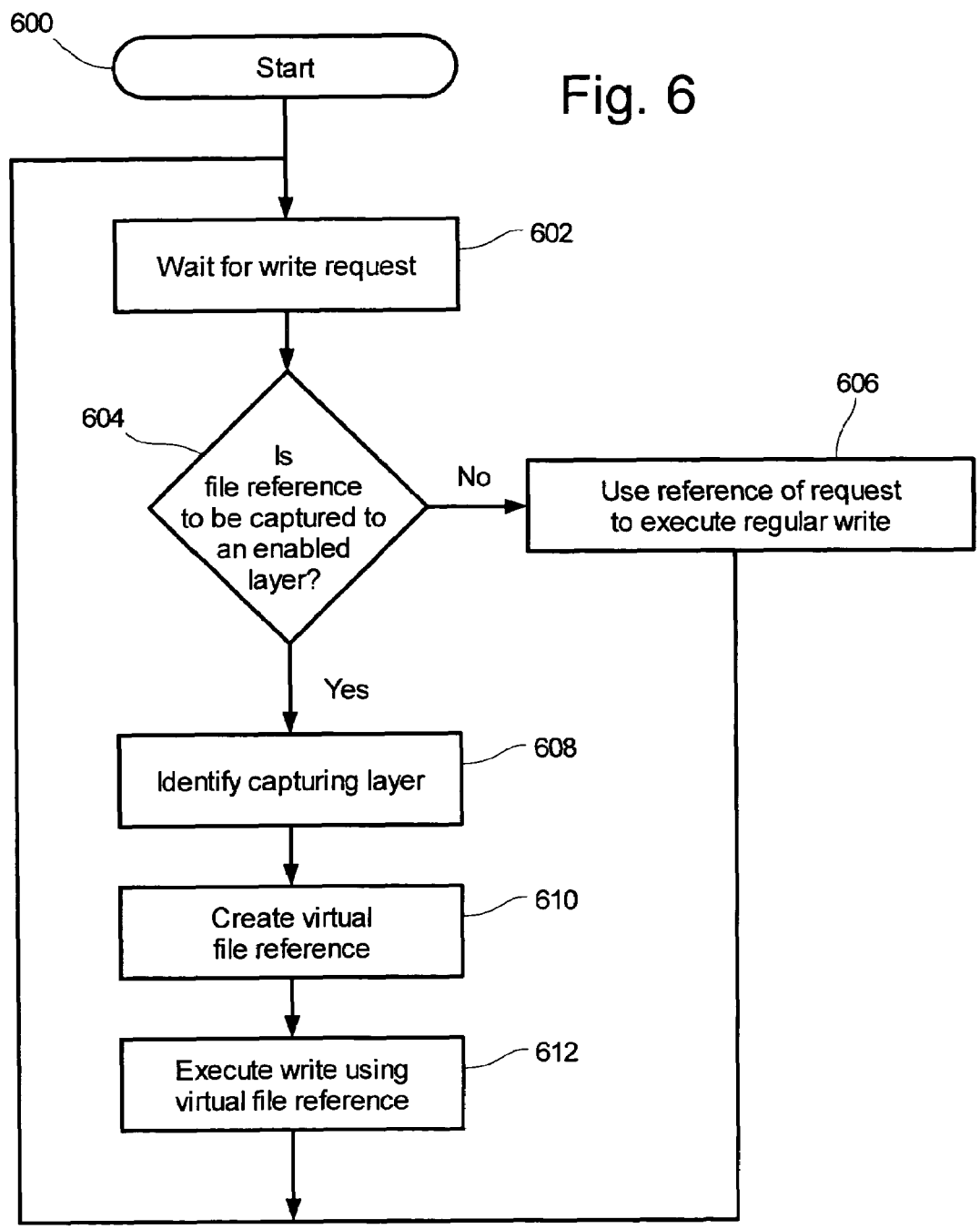

Fig. 11B
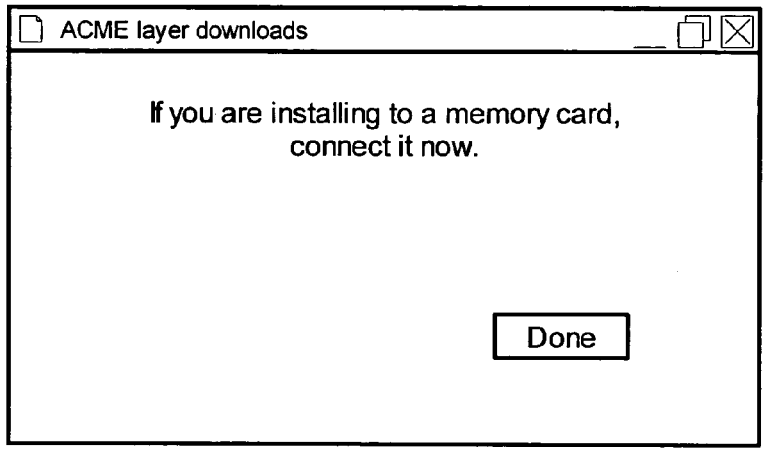
Fig. 11C
Fig. 11D
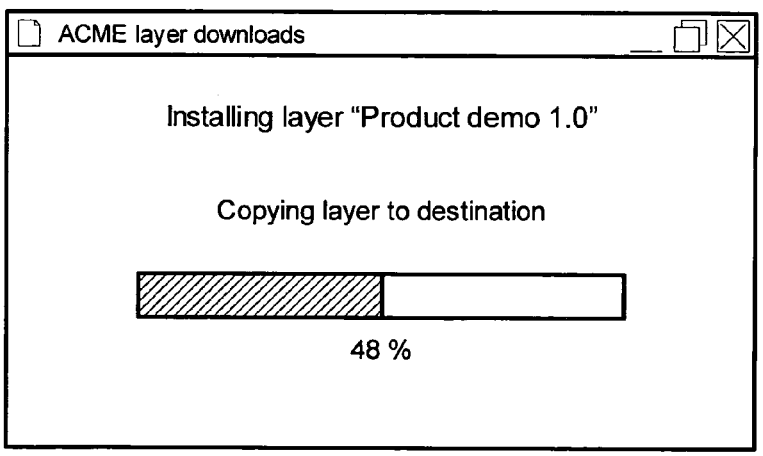

Fig. 11E
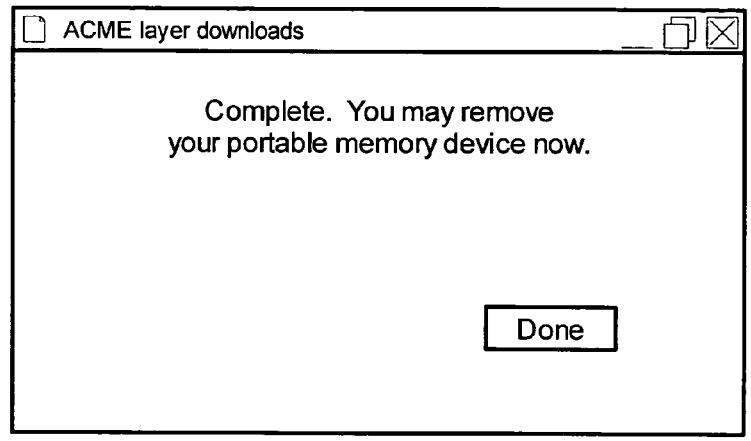
Fig. 12
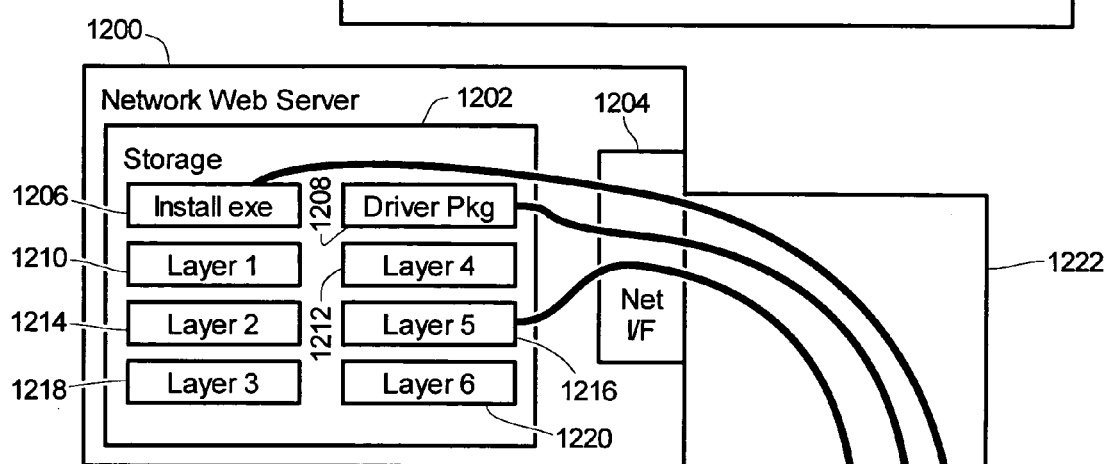
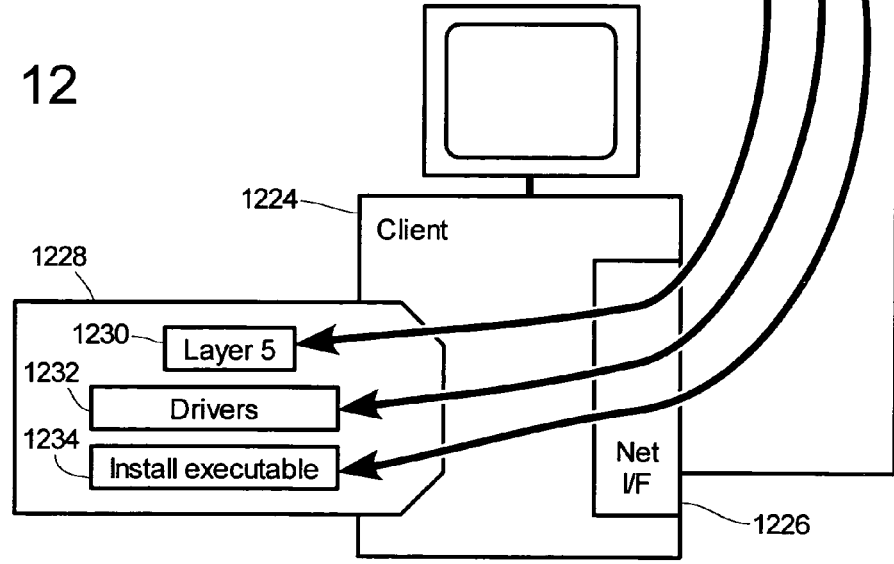

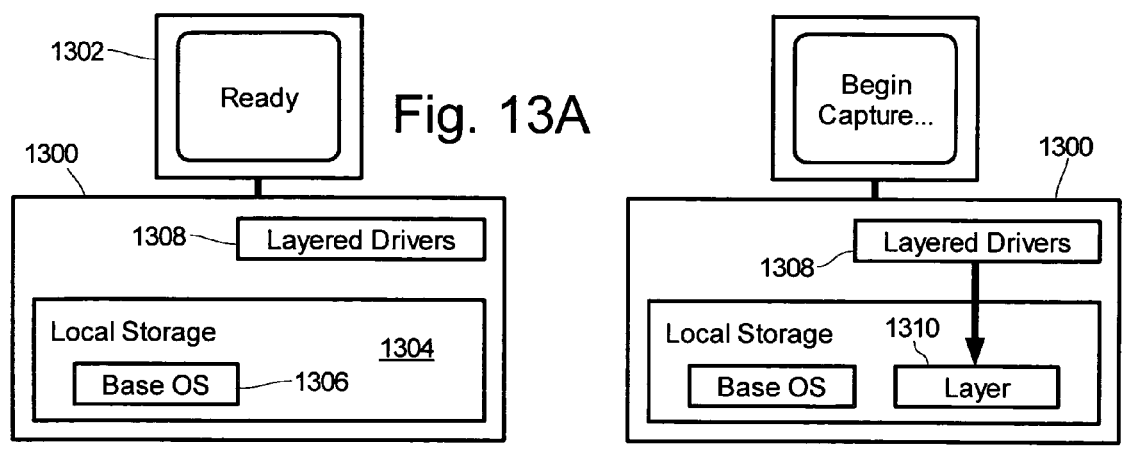
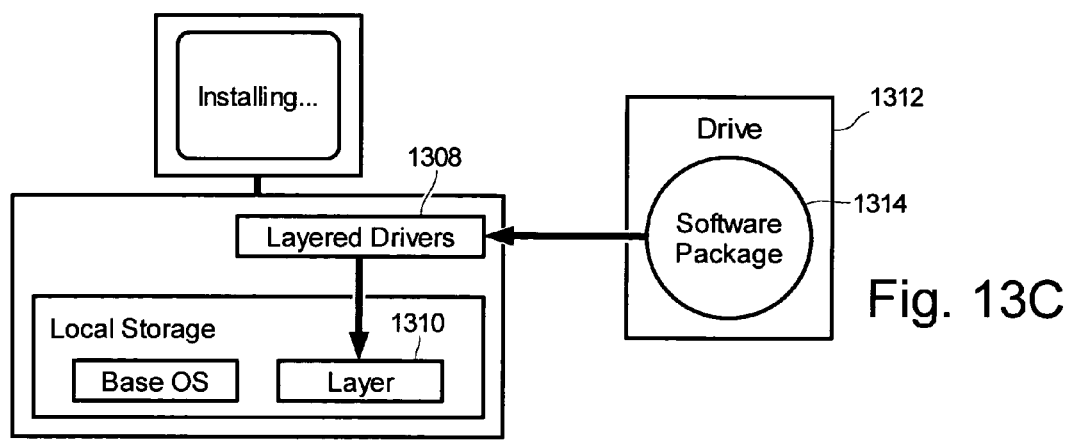
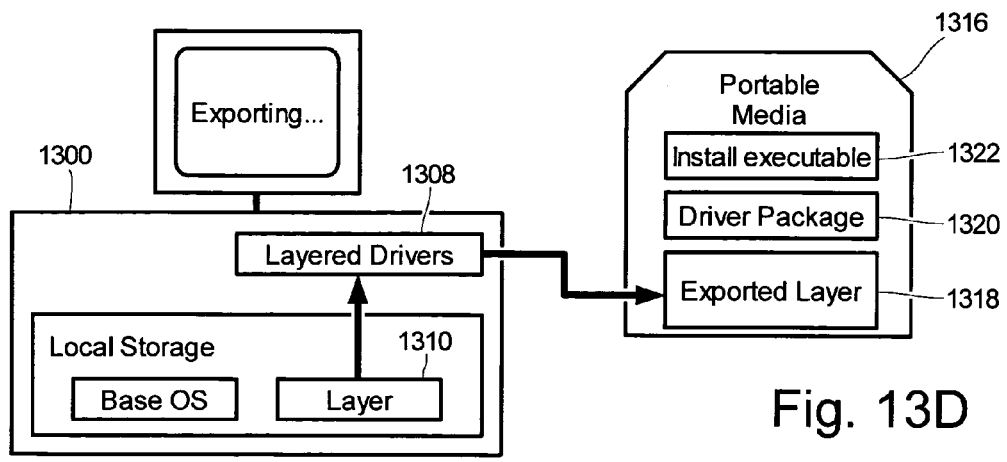

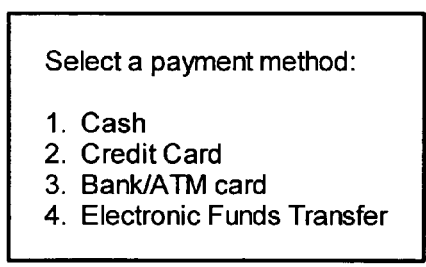
Fig. 14B
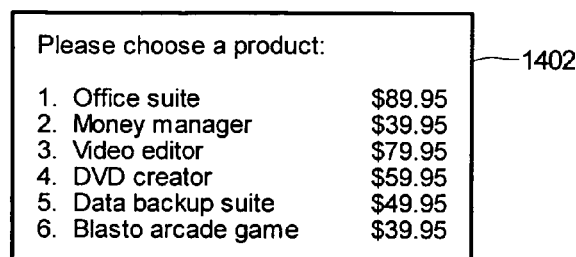
Fig. 14A
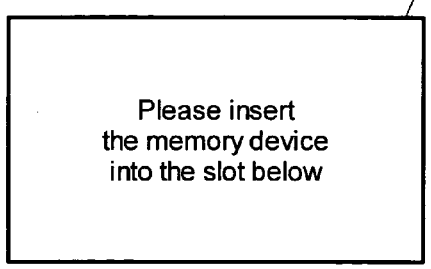
Fig. 14C
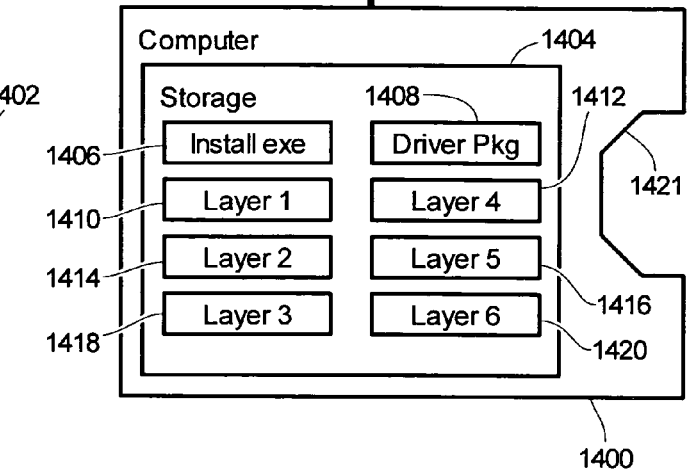
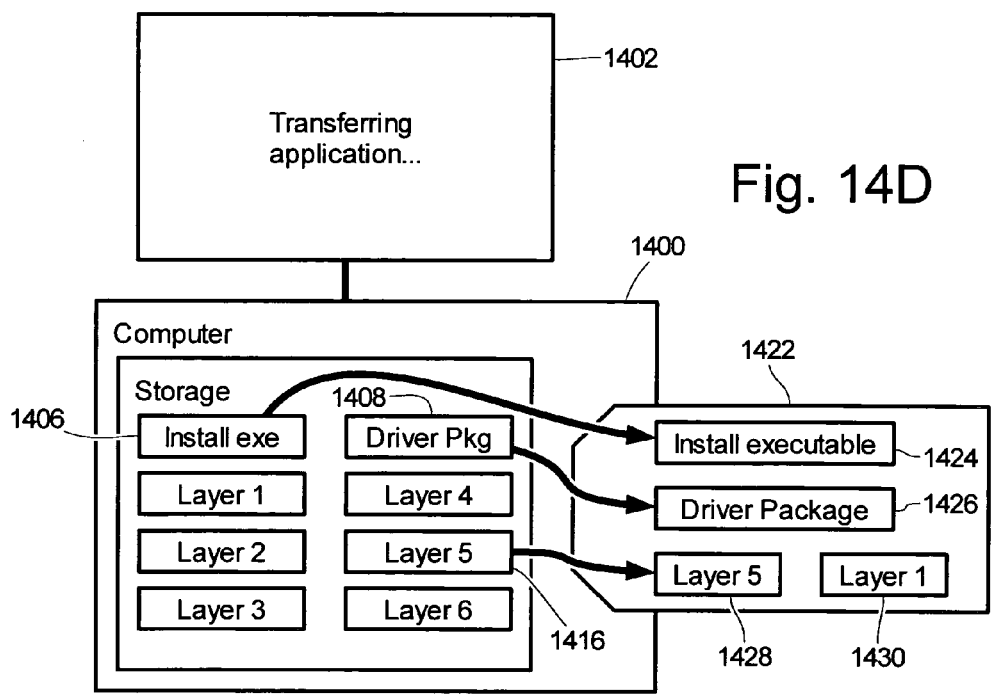
Fig. 14D

PORTABLE MEMORY STORAGE DEVICES WITH APPLICATION LAYERS

CROSS-REFERENCE TO RELATED APPLICATIONS

This application is a continuation-in-part of U.S. application Ser. No. 10/459,936 filed Jun. 11, 2003, now U.S. Pat. No. 7,117,495 which is hereby incorporated by reference in its entirety. This application claims the benefit of U.S. Provisional Application No. 60/533,388 filed Dec. 30, 2003 which is also hereby incorporated by reference in its entirety. This application additionally contains subject matter related to U.S. applications Ser. Nos. 10/459,768 and 10/459,870, each of which is hereby incorporated by reference in its entirety.

BACKGROUND OF THE INVENTIONS

In the last two decades computers have developed into sophisticated machines having powerful processors and large amounts of memory and local data storage. A modem computer has installed thereto a large operating system, which today includes not only low-level functions for accessing input, output and storage devices, but additionally libraries providing common functions to applications, graphical windowing systems, and applications to perform administrative functions, data access functions, and even multimedia and entertainment functions. The common practice of using applications requires the installation of an application's executable, configuration and data files to local storage, although some applications and systems extend this to use of network drives as well. Today's computers also multitask, and permit more than one application to be installed and executed thereon concurrently. This sophistication in the operating system in combination with the large number of potential applications from diverse sources has made the administration of a typical modem computer more difficult.

With the advent of graphical operating systems, users were offered a way to visually interact with a computer. This visual interaction made possible a new heirarchical organization to the computer presentation, typically including a top-level presentation, for example a 'desktop' with a top level 'start' menu, and further including sub-presentations such as application windows. Executing applications under that mode may be performed by acting on icons and menu items, relieving the user from the burden of having to know the logical location of items in a filesystem to use them. These icons, shortcuts, links and menu items all point to an executable or other object at their true reference points. If the reference object is moved to a different location in the filesystem heirarchy, the link to the object becomes broken and non-functional; in some operating systems the system may attempt to resolve the new location of the object and fix the link.

In personal computers of the early to mid-1980s, applications and data were typically stored to a floppy disk, with little to no other non-volatile storage available to programs. Those disks could be transported between computers of the same type, thereby making those applications portable. The execution of those applications, however, was from the command line, which required some user expertise. A user, for example, might need to know that an application's executable was located on drive '0' or 'a:'. Should an application disk be inserted to a second drive, the application might be required to be reconfigured to reference data and configuration objects on that second drive. The computer and operating system makers of the time largely left the problem of application mobility (moving an application to a different drive or location) unaddressed, which required users to maintain many applications in static locations even though stored to floppy disks.

Other types of portable storage have been used in the past. One early example was a cartridge including a read-only memory and a card-like interface mating to a socket, for example in a game console. Those cartridges contained no file-system, but rather were presented as instructions and data at particular addressible memory locations. In addition to floppy disks, mentioned above, high density magnetic media cartridges have been used, for example "Zip" disks. The improvement therein related mainly to the amount of data that could be stored on the portable media. Other examples include optical and magneto-optical disks, some of which are commonly known as CDs and DVDs. The advent of these permitted the cheap distribution of software and data, supplanting the use of floppy diskettes and permitting the growth of software applications to many megabytes. Those software makers have taken advantage of the increasingly large amounts of local hard drive storage for applications, and have largely not attempted installations other than to a local hard drive. Today, nearly all software packages perform an installation step in which the application's files are installed to a local hard drive of a computer.

Most recently, devices have become available which utilize a non-volatile random-access memory (NVRAM); the recent advances of integrated circuit technology permitting manufacture of such a device of a size to permit a person to carry hundreds of megabytes of data in a package that will easily fit into a pocket, purse or briefcase. Notable form-factors include Compact Flash, Secure Digital, Memory Stick and several others, which incorporate a type of NVRAM referred to as "Flash" memory, which has become relatively inexpensive to produce. Those form-factors have included interfaces designed typically for small electronic devices such as digital cameras or personal data assistants (PDAs). More recently, devices have become available which include a Universal Serial Bus (USB) controller, by which the these devices are made accessible as file storage "drives" to more recent computers having USB ports without an additional interfacing device, provided that certain drivers are installed to the computer or included in the operating system. Most recently, computers have been manufactured that include slots for interfacing with a flash card and the necessary electronics and drivers to access the flash memory as an external hard drive.

Applications can be stored to a portable flash memory device, but in present systems the applications files are viewed in a separate logical location than the files and directories of the base operating system, as no attempt is made to integrate the applications with the applications of the operating system. Indeed, prior systems provide no direct linkage to applications, registry changes, and changes to a base operating system whereby the applications on a removable storage device may be integrated in the base system. Because of the difficulty of this integration, the present use of portable storage devices is largely restricted to the storage of application data, accessible to applications installed to a host computer system.

In all of the above examples, the most convenient uses of applications are either installation of the application to a local hard drive or use of applications stored on portable media in a known or determinable position in the filesystem heirarchy of the computer. In the latter use, the application might be used on more than one computer, provided that the user has sufficient expertise to configure the application and operating system with any necessary icons, drivers, and directory locations.

In an additional method, some operating systems include the function of automatically running an executable at the time of media insertion. This is usually done by testing for the presence of a file with a specific filename, for example "auto-run.exe", which is executed by an operating system process when media insertion is detected. This method is sometimes used to run an application installer, or alternatively to run a main application stored on a compact disc.

From the early days of personal computers to the present time, bootable portable media disks and other media forms have been used to provide functionality to a computer without a requirement of a hard disk containing an operating system. For example, several computer makers have included a "disk operating system" (DOS) on a floppy disk, which provided common functions for interactions with the disk and other computer functions as well as a shell environment for basic human interaction. Even earlier systems used reels of tape and even stacks of punched cards to boot a computer, although most of those would hardly be considered portable by today's standards. Modem software makers may create bootable compact discs, for example to install an operating system freshly to a computer. Other makers may create operating systems that run entirely from the compact disc, and may not require that local storage of any kind be present.

One example of such a system is the Mandrakesoft "Move" Linux CD presently available from Mandrakesoft of Paris, France. In that system, a user may connect a USB flash drive to a computer booted from the Move CD, thereby providing a location to store user data. The CD and the flash drive can be caffied to a different computer, which can be booted using the CD and flash drive, thereby providing access to the user data. The user, however, has little choice in what applications are available in that system, as the CD is distributed with a fixed application set intended for general use.

Other uses of removable media have included synchronization of data on a local hard disk with the media, for example the "Migo" flash media product from PowerHouse Technologies Group, Inc. of San Ramon, Calif. Such a product may include applications installed thereto which can be run by a host computer, for example, when the media is connected to a computer that supports automatic execution. Even so, those applications can be expected to appear separately from the host computer's installed applications.

Additionally, prior computing systems have been susceptible to application conflicts with the host operating system (OS) and other applications. When an application is installed to an OS, a number of globally accessible files are often placed to the computing system, including for example shared libraries and system configuration. Those shared libraries are often provided in different versions, with applications requiring one version or another. A mismatch between a library version and a version required by an application sometimes results in that application crashing, becoming inoperable, or exhibiting other errors. Shared configuration elements are sometimes globally available to applications, which may write a favored configuration thereto. Following a write to that configuration other applications may be unable to read the configuration properly, or may be unable to function under a new specified configuration. Thus it is that following the installation of an application to a computer, other applications may stop working.

Installing a number of applications to a computer can be something of a black art. An administrator may, with good intentions and understanding, install several applications to a computer. Upon testing an installation or during use, the administrator or a user may discover that one or more applications operate errantly or not at all. It is usually not apparent which applications are in conflict. The administrator may enter a procedure in which applications are uninstalled from the computer in a process of elimination to find the offending applications. Sometimes de-installation programs do not remove all installed files, in which that procedure may fail to locate the problem. The administrator is then required to continue by creating a clean (or "virgin") installation, and installing applications one at a time until the problem is located.

When applications are found to conflict, a choice must usually be made as to which one will be installed. One of the applications is sometimes installed to a different computer to avoid the conflict. If conflicting applications must be installed to a single computer, a new version of at least one of the applications must be sought and purchased from the software vendors. A non-conflicting version may not be available, especially if a vendor is small, not supporting the application, or no longer in business.

Snapshot utilities are available, which generally operate to create a database of all files and registry settings on a computer. Prior to installing an application, a snapshot is taken of the files and registry settings. The application is then installed, and tested. If the application fails to work satisfactorily, the system can be restored by comparing the existing files and registry settings against the snapshot and removing installed files and otherwise restoring the system as before. Snapshot utilities have several limitations. First, if a newly installed application causes a prior installed application to fail, it is often not possible to simply revert to a snapshot made prior to older application installation, especially if there have been other applications installed in the interim. The administrator may be required to revert back to the earlier snapshot, and then re-install the intervening applications and the new application. Additionally, there are usually a limited number of snapshots that can be stored, and thus a required snapshot may not have been retained when found to be needed.

Likewise, a system may be restored to an earlier state if backups have been made. That restoration process, however, usually involves a significant amount of time and destroys all data recorded to the system after the time of the backup.

Another method involves recording a series of changes (or "diffs") to a buffer. Using that method a system can be restored back to a point in time by reverse application of the diffs to the file system back to the selected point in time. That method typically requires a fixed amount of disk space for the diff buffer, which becomes unavailable for regular use. As the buffer becomes full, the only way to continue to record diffs is to overwrite older diffs. Because of this limitation, the method can only restore a system back to a date for which diffs remain available. In addition, this method requires three disk operations per write request: one to read the existing disk information, one two write the diff, and one to write the original request. This method is therefore processor and disk intensive.

The Microsoft Windows ME™ OS includes a feature called "System Restore". That system is essentially a snapshot system, and only backs up files related to the OS and installed applications (not user files).

A current practice of maintaining computers is to image the hard drive of a computer while in a working state. If the computer becomes unstable, or if undesirable content appears on the computer, the computer's drive is restored using the earlier made image. This practice is lacking in that all changes made following the image creation are wiped off the system when the computer is restored, including user files and other applications.

Also, some applications are not provided with an uninstall program. To de-install those applications an administrator is required to know where the application files and settings reside in the system, and remove them manually.

BRIEF SUMMARY OF THE INVENTIONS

The inventions relate generally to portable media storage devices that contain layers permitting applications to be used at a connected computing device, those systems optionally including drivers for operating a layered computing environment or a driver installation program. Also disclosed herein are computer systems for using other systems for creating those portable storage devices. Detailed information on various example embodiments of the inventions are provided in the Detailed Description below, and the inventions are defined by the appended claims.

BRIEF DESCRIPTION OF THE DRAWINGS

FIG. 3 illustrates components of a particular layering computer system.

FIG. 4 illustrates components of a layering computer system at simple organizational level.

FIG. 5 shows a simplified method for performing read file system operations using a layered computing system.

FIG. 6 shows a simplified method for performing write file system operations using a layered computing system.

FIGS. 11A, 11B, 11C, 11D and 11E depict several screens during an interaction whereby layers are deposited to a portable storage device.

FIG. 12 depicts a network system useful to distribute layers to a group of users publicly over a website.

FIG. 13 illustrates a simple method of creating a portable storage device.

FIGS. 14A, 14B, 14C and 14D depict a kiosk computing system, and the operation thereof, usable by an ordinary person to load application layers to a portable storage device.

Figure 1:
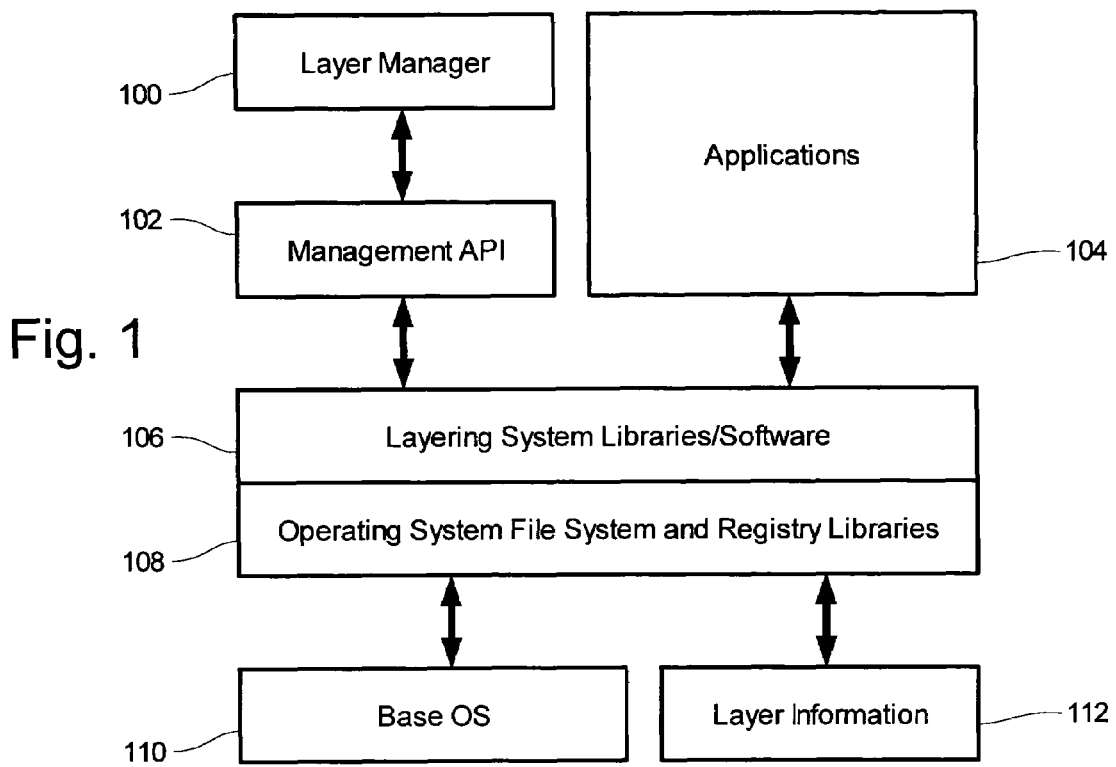
FIG. 1 illustrates components of a layering computer system at a conceptual level.

Reference will now be made in detail to some embodiments of the inventions, example of which are illustrated in the accompanying drawings.

DETAILED DESCRIPTION

General Concepts

For the purpose of simplifying the discussion herein, several examplary computing devices are referenced. Those devices are typically a conventional personal computer or workstation having a CPU, memory, display, keyboard, mouse, and at least one fixed disk. It will be apparent to one of ordinary skill in the art that the concepts disclosed herein may apply equally to other computing systems that are not personal computers, for example diskless workstations, headless workstations or servers, embedded systems and many other types. Herein it is contemplated that the inventions may be applied to these and other computing systems, both existing and yet to be, using the methods and principles disclosed herein.

Likewise the discussion below speaks of Registries and registry settings, which are specific to Microsoft Windows™ operating systems. It will be recognized that registry settings are merely configuration for the operating system and applications installed to a computing device, accessible through a system-wide API. The meaning of registries and registry settings is therefore extended to future Windows operating systems and operating systems other than Windows, where equivalent structures and access facilities exist thereon.

In the discussion below, the words "enabled" and "activated" are used interchangeably to describe layers that are active or enabled on a layering computing system. Likewise, the words "disabled" and "deactivated" may be used to describe layers that are not enabled or active.

Generic Layered Systems

Provided in one aspect of the invention are application layers which are isolated from other applications on a computer. In that aspect, an application layer may be defined to be a group of files in combination with any associated application configuration stored to operating system files. An application of a layered system may be an application in the most commonly used meaning, such as word processors, browsers, system tools, games, and the like, or may extend to other software installed to a host providing an environment, such as a graphical user environment or shell. It will be seen that isolating application files and configuration in a layer provides several benefits, including the ability to delete, disable, and enable applications in a simple way and to provide a barrier between applications which may use conflicting configuration or library files. The use of a layering system may therefore enhance the stability, reliability, usability and security of a computing system.

A layered system introduces a new concept of organizing data from disparate sources and presenting a virtual view of that data to an operating system and a user. This permits the real data to be much more logically organized while still presenting to the operating system and the user an expected view and access of that data. In a sense, a layer is a higher order storage unit. Because a layer can be managed as a unit for the purposes of exporting, importing, enabling, disabling, and so on, a computer system and user data can be managed with a greater degree of flexibility and reliability, also with improved security. As changes to a layered system are made, the changes are organized while being written, rather than merely tracking the changes made. By doing this both a speed penalty and the dedication of large amounts of storage for images and changes are avoided.

Depicted in FIG. 1 are components of a layering computer system at a simple conceptual level. A base operating system 110 forms a platform with which applications can be run and files can be accessed in file systems. Base operating system 110 further has registry settings, globally available to applications for reading and writing. The system has libraries 108 for executing the functions of the operating system including operating file systems and registries, and other operating system functions. Tied into libraries 108 are layering system libraries and/or software 106 which intercept file system and registry accesses from applications 104. As accesses are received from applications 104, the layering system software 106 performs computations to determine whether the accesses should be permitted to continue to the base operating system 110, or should be redirected to layer information 112, the information relating to and the contents of files and registry settings. A layer manager application 100 may be provided to permit control and configuration of the layering system software 106 through a management API and library 102.

Figure 2:
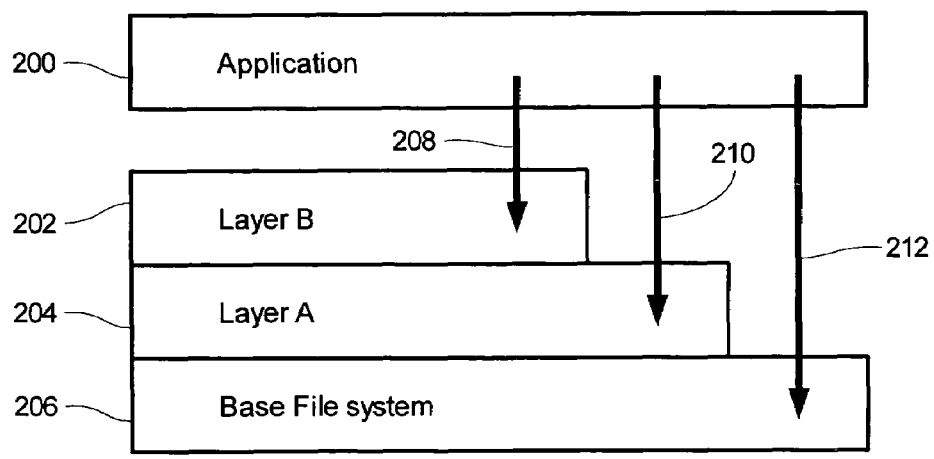
FIG. 2 illustrates an operation of a layering computer system at a conceptual level.

Depicted in FIG. 2 is the operation of a layering computer system at a conceptual level. An application 200 is running on a layered computing system. This computing system contains a base file system 206, and two layers labeled "A" and "B", 204 and 202 respectively. In this example layer B has priority over layer A, which in turn has priority over the base file system. A first file access 208 is made by application 200. The layered computing system determines the owner of the file being accessed. Finding an entry for file access 208 in layer B, the corresponding file in layer B is opened and returned to the application. The file access of 208 might also correspond to files in layers A or the base file system, however layer B is determined to be the owner as it has priority over layer A and the base. Another file access 210 is made by application 200. The computing system does not, however, find a corresponding entry in layer B. An entry is found in layer A, which has priority over the base file system. Again, if a file existed in the base file system corresponding to the file access, the file reference in layer A would be accessed because layer A is found to be the owner with priority. The computing system is not able to find corresponding entries in layers A or B for file access 212, so that access is made to the base file system.

In FIG. 4 components of a layering computer system at simple organizational level are shown. A computing device includes a processor 400, which may also have peripheral devices attached such as memory, input devices or output devices as desired. Processor 400 interacts with one or more storage devices 402, providing storage for the processor. On storage 402 is a base operating system 408 and applications 410. A number of layers 404a-n are also contained on storage 402, each having applications 406a-n.

In larger aspects, a layer may be defined to be a set of file system and registry changes, that combination forming an organizational unit that may be managed by layered system software. In some cases, a layer need not contain registry changes, but only changes to one or more file systems. In those cases it may be desirable to limit support in the layered system software to files of file systems. A layer definition may include layer properties and settings, layer inclusive files, references to those files, registry settings and locations, and a manifest or directory those file and registry references.

References may be made inherent, if desired, by locating files and registry settings in a structure that mirrors a real underlying file system. Such a mirroring system may be organized in a common directory, with one subdirectory per defined layer, each containing a mirrored directory structure of the underlying file system.

An exported layer will contain all of the layer-included information bundled in a transportable archive. Exported layers may be further bundled into groups, which is especially useful for layers that rely on other layers, such as layers of a hierarchy or peer layers. For systems that utilize a mirror structure of an underlying file system, it may be desirable to hide the mirror structure from applications, except perhaps a manager application, so as to prevent accidental data modification, loss, or meddling.

A layer intending to isolate a host-installable application has stored thereon the files and directory structure of the application's installation, as they would have been installed to the base operating system. When that layer becomes mounted (or enabled), those application files and directories are shadowed or overlaid over the regular operating system file system. Shared libraries (such as DLLs), system accessible configuration (such as registry entries), and version control are managed by the layering subsystem, optionally using an internal database. Though each layer is a separate and individual entity within the host OS, the application files, data, and system accessible configuration are presented as if they resided in their respective ordinary locations. Thus an application stored in a layer appears to the host OS as if it were installed in the ordinary fashion with the expected functionality.

For example, suppose a layer existed in a Windows OS environment that specified that in C:\windows there should be a file called winfile.exe. Also suppose that a file of this name did not reside in the true C:\windows directory. When the layer is not active, a file listing of C:\windows does not show a winfile.exe. When the layer becomes active, the layering system merges (or overlays) the true listing of C:\windows and the file list described in the layer. In this example, applications (and thereby a user) would see all of the files in the true C:\windows directory and winfile.exe. Registry values in a layer may be handled in a similar manner.

Shown in FIG. 5 is a simple method for performing read file system operations using a layered computing system. A loop is entered beginning at step 500. Execution halts in step 502 pending the receipt of a read request. A determination is then made in step 504 as to whether or not the file reference of the request is maintained in an enabled layer. To perform that determination all the layers on the system are generally examined for a virtual file corresponding to the file reference of the request. If no enabled layer contains such a virtual file, step 506 executes in which the usual read operation is executed using the file reference of the request. Otherwise, an owner layer is identified in step 508. For example, if two enabled layers contain a virtual reference to a file, one will take priority over the other and be identified as the owner layer. Step 510 then executes, in which a virtual file reference is determined that corresponds to the file reference of the read request. That virtual file reference might be an offset and length for a storage device in some systems, a pathname at a mirrored location in other systems, or other reference. Afterward, the read operation is executed using that virtual file reference in step 512. The procedure of FIG. 5 may also be modified to consider ownership first, examining enabled layers in order of an ownership preference to promote efficiency.

FIG. 6 shows a simple method for performing write file system operations using a layered computing system. A loop is entered beginning at step 600. Execution halts in step 602 pending the receipt of a write request. A determination is then made in step 604 as to whether or not the file reference of the request should be captured to an enabled layer. That determination may be made, for example, by noting the state of the system software is in a capture state, and in some circumstances by noting the PID of the calling application and parents. If no enabled layer is configured for capture, step 606 executes in which the usual write operation is executed using the file reference of the request. Otherwise, a capture layer is identified in step 608. Step 610 then executes, in which a virtual file reference is determined that corresponds to the file reference of the write request. That virtual file reference might be an offset and length for an unused portion of a storage device in some systems, a pathname at a mirrored location in other systems, or other reference. Afterward, the write operation is executed using that virtual file reference in step 612.

The read and write operations spoken of in the discussion of FIGS. 5 and 6 may be performed on some systems through an open( ) call. A read request, for example, might be a call to open( ) with a pathname as a file reference and "r" as an option. Likewise, a write request might be a call to open with "w" or "+" as an option. In either case, a file handle is returned which would correspond either to a true file reference (if the file reference is not managed in a layer) or to a virtual file reference (if the file reference is managed in at least one layer). That file handle will continue to be used in data read and write operations, and thus the data will be delivered to and from the correct system locations. Other systems may use other equivalent methods of opening, reading and writing, and applicable using methods similar to those described herein.

Figure 7:
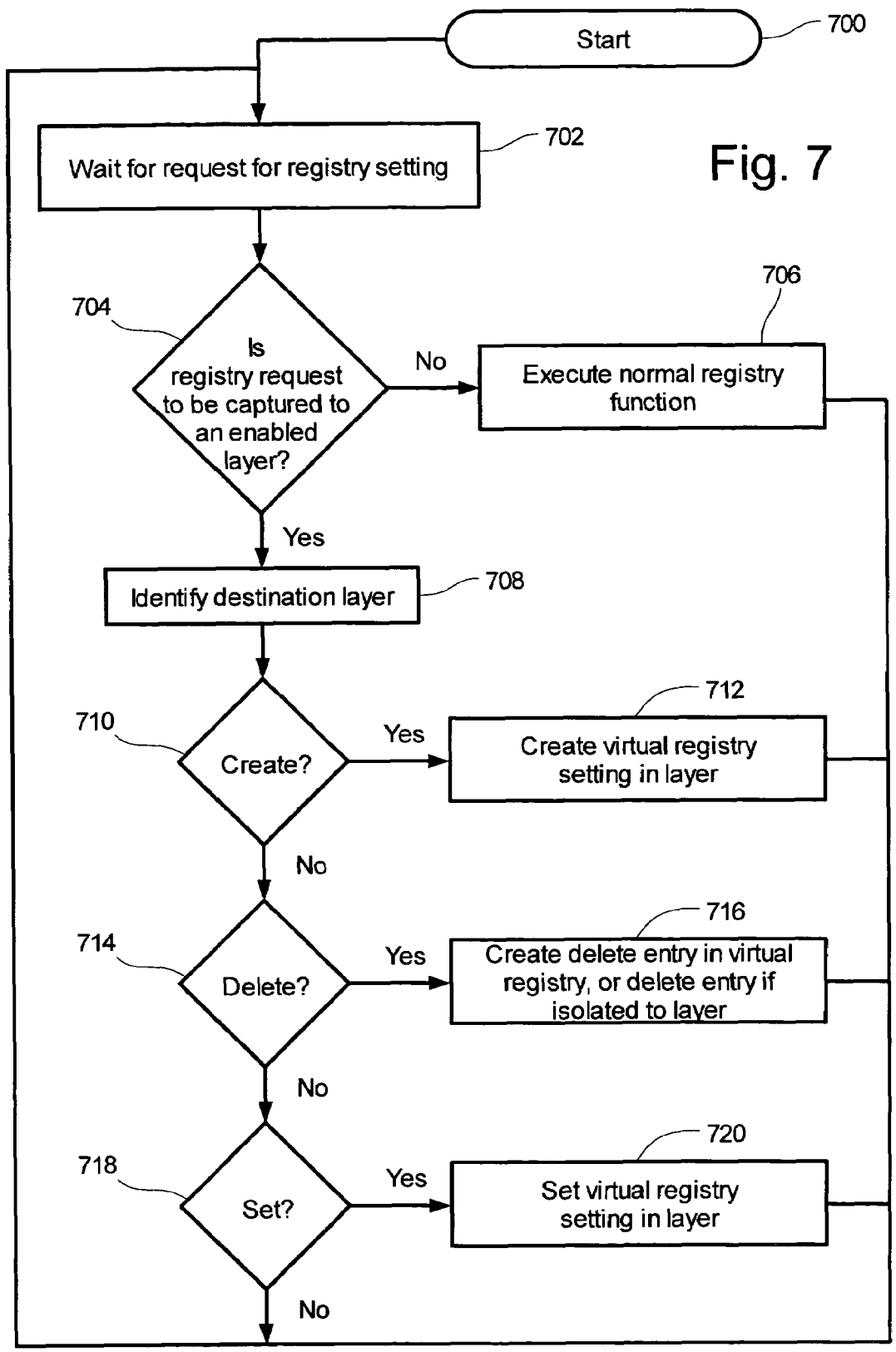
FIG. 7 shows a simplified method for performing registry operations using a layered computing system.

FIG. 7 shows a simple method for performing registry operations using a layered computing system. The method begins at step 700, following which a pause is executed at step 702 until a request for registry setting operation is received. When a registry setting request is received, step 704 executes in which a determination is made as to whether or not the request is to be captured to an enabled layer. If not, step 706 is executed in which a usual registry function is called, as if layering were not present in the system. Otherwise, step 708 is performed, in which a destination layer is identified. Step 710 tests the request for a registry entry creation request. If a creation request was received, step 712 executes in which a virtual registry entry is created in the destination layer. Otherwise step 714 is performed, testing for a registry entry deletion request. If positive, step 716 is executed in which either a virtual registry entry is deleted, if the entry exists in a single layer, or a delete entry is made in the virtual registry of the destination layer signifying that the registry entry should not appear while that layer is enabled. If the request is neither a create or delete request, step 718 is performed testing for a set registry entry request. If positive, step 720 executes creating a virtual setting in the destination layer.

As in the above example, layers may contain file and registry deletion references. Those references may be used where a layer specifies the absence of a file or registry setting, whereby a specified file or registry setting will appear to be absent from the computing system only when the layer is enabled.

Figure 8:
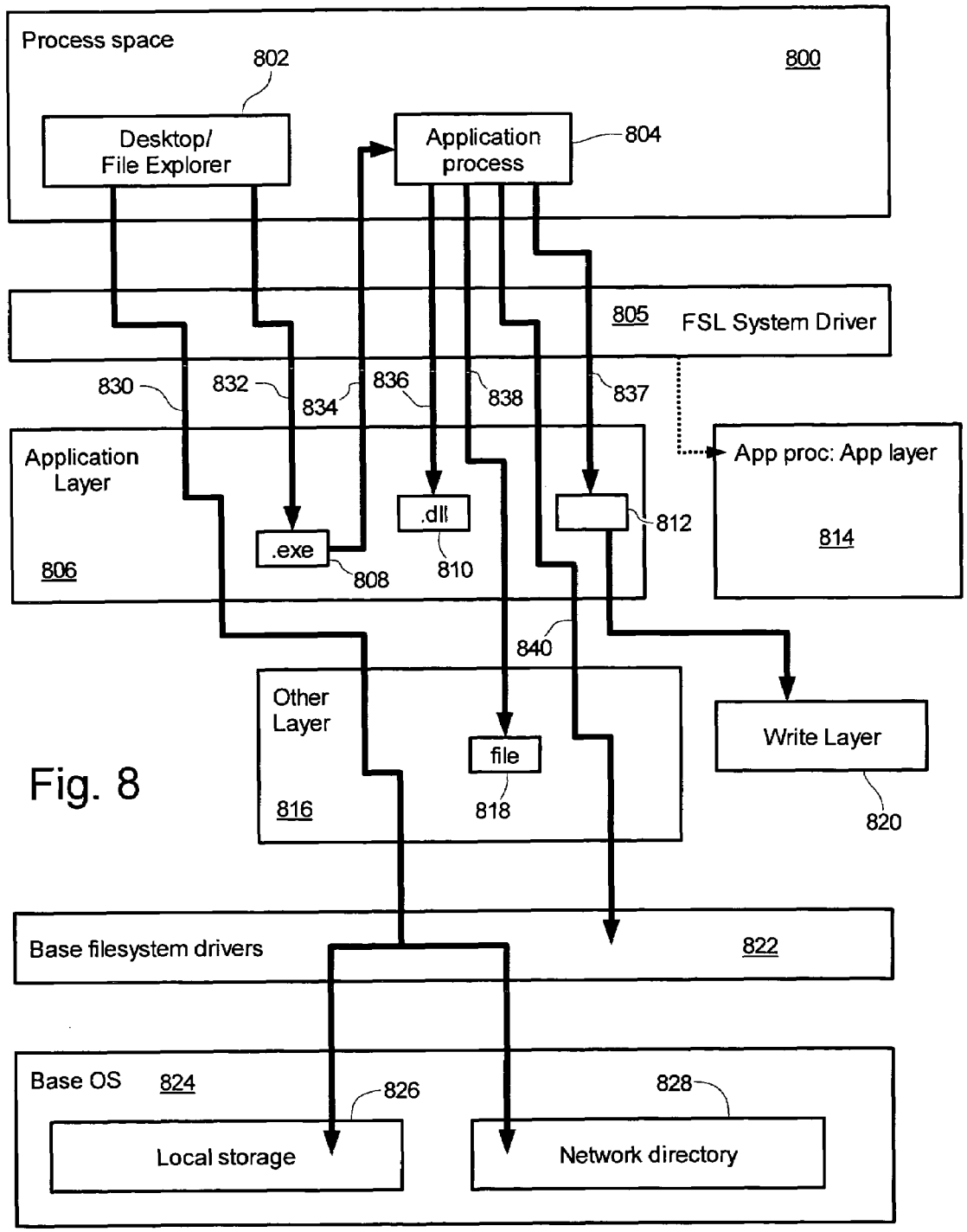
FIG. 8 depicts a flow of operation for an examplary layering system supporting application layers.

Referring now to FIG. 8, a flow of operation is depicted for an examplary layering system supporting application layers. In the discussion below, references to files will be spoken of. References to a registry, for example a system registry, may be treated similarly to file references by including processing for registry entries in addition to file entries.

A base operating system (base OS) 824 provides facilities for interactions with files stored to local storage 826, which for example might be a hard disk drive, and optionally to a network directrory 828, with those files generally being presented similarly as with files on local storage 826. Base OS 824 includes base filesystem drivers 822, which may be integral to the base OS or might be modular in nature, and provides file access to applications running under the base OS 824. A layered driver 805, in this case an FSL system driver as described below, is installed to provide access to layers as will presently be described. Further in this example, an application layer 806 is enabled for use by the system by way of driver 805 to provide access to files contained in the layer. Another layer 816 may also be enabled.

In the example of FIG. 8, a file explorer application 802 is provided with base OS 824. File explorer may make requests for directory listings and for file accesses. In a first access 830, the desktop application requests access to a file reference by using the usual procedure calls. On installation, the layering driver 805 has modified the destination of those procedure calls so that it may process them prior to processing by the base OS drivers 822. First access 830 is first reviewed by the layering driver 805 by first reviewing application layer 806 for the presence of a file entry matching to the access reference. For the first access, a match is not found and the access is permitted to progress. If other layer 816 is enabled, it is in turn searched for a matching file entry, in this example after application layer 806 due to the secondary priority placed to other layer 816. If after searching the enabled layers the layering system drivers 805 finds no entry matching the first access reference, the first access is permitted to follow the normal route of access through the base filesystem drivers 822, which may result in a file access in local storage 826 or network directory 828.

A second file access 832 is made from explorer 802, this time in the form of a command to execute a file, for example by a user double-clicking on an icon. For access 832 an executable file entry 808 is located in application layer 806. The locating of entry 808 results in a corresponding virtual reference, which is used to reference the data corresponding to the file entry. That data is loaded into RAM 834 and executed, resulting in a new application process 804. Layering drivers 805 notice that application process 804 is started from application layer 806, and make a relation 814 of that process to the layer from where it came, for example by referencing the PID of application process 804. The execution of application process 804 results in a request to load a library, which in turn results in a file access 836 for a. dll file. Layering drivers 805, utilizing the relation 814 made earlier, detect that application process is related to application layer 806, and first looks for the file reference in the application's layer 806. The layering driver 805 finds an entry 810 for file access 836 in the application layer, the file entry 810 referencing a library specific to application process 804. That library is loaded into memory using the same procedure as the ordinary procedure provided by the base OS 824, with the exception that the read calls are redirected into layer 806 using a virtual reference.

Application process 804 makes a read request 838 for an additional file. No entry is found in related application layer 806. The layering drivers continue to search for a file entry corresponding to the reference in other layer 816, where a file entry 818 is found to match. The data of that entry is delivered to application process 804, even though the file entry is located in a different and lower-prioritized enabled layer. In a third file access 840 layering drivers 805 find no corresponding entry in enabled layers 806 and 816, and pass that access to the base filesystem drivers 822. A fourth file access 837 is an access to write to a file. In the example of FIG. 8, a write layer 820 is enabled to capture changes that would have been made to unprotected areas of accessible filesystems, for example the base operating system or a protected layer. Also in this example, application layer 806 is configured as a read-only layer and a file entry 812 exists in that layer for the write reference 837. Layering drivers 805 do not carry the write operation to file entry 812, but rather create a new entry in write layer 820 for the written data, or modify a corresponding pre-existing entry in the write layer 820. Write layer 820 is prioritized over application layer 806 by the layering driver 805 to read modifications to a file reference first rather than the file data as originally created in the application layer.

The above exemplary layered system is an example of a public layered system. In that type of layered system, applications not stored to an application layer may be given access to its contents. Thus processes such as explorer 802 can access the contents of application layer 806. In contrast, a "layered" system may be constructed with a private context. In that type of system, the contents of "layers" are made available only to a particular parent process, which might be a wrapper application that bootstraps drivers to intercept file accesses from processes started from a particular layer. Private context systems, however, do not permit applications generally to access the files within those "layers." A file explorer, for example, could not "see" into a private contextual layer either to execute an application or to access data files within. The contents of such a "layer" are thereby sandboxed and isolated from most if not all the applications on the computer. Additionally, because those layers are sandboxed from other layers, the stacking of layers is not possible; the choice of layers in a private context system is therefore simplified to relations between a wrapper application, it's child processes and the "layer" it is associated with.

A public context layered system, by contrast needs no wrapper applications to access and/or execute the contents of layers, as those contents appear to all applications generally (provided access to the layers is not restricted, for example by encryption). Additionally, several layers can be presented on the system at the same time to applications generally, which provides flexibility in the creation of layers and layered application frameworks. Most apparently to a user, the contents of a layer become immediately and generally accessible upon enablement of the layer without additional steps and complication.

The use of a layering system as given above provides several advantages. If applications are stored individually in layers, interactions between application files may no longer occur due to conflicting shared libraries (DLLs), as each application 'sees' only it's own installed libraries first, followed by libraries in the base operating system, those base libraries optionally preceeded by libraries from other layers if desired. Applications captured in a layer may be safely and completely uninstalled by simply removing the layer from the host computing system. Different versions of an application may be stored as layers on a single computer; the user may select a desired version by enabling the particular layer. A layering system may also extend the file systems of the OS beyond physical limits if layers are stored on separate disk partitions or remote file systems. If layering is used for a group of installed applications, the computing system may be restored to a "virgin" or checkpoint state by removing one or a group of application layers. The transfer of applications between similar computing systems can be simplified, in that the transfer may be done simply by moving the layer containing the application. The bundling of an application and user files into a layer provides a package that may be compressed or encrypted and transported conveniently. Using a layering system application vendors can provide 'pre-installed' applications as layers on CD-ROM or other media, those applications being pre-tested and guaranteed to work with a high reliability. A layer also provides a convenient container to limit access to an application, for example for time limited use or license key access.

In some preferred systems, the enablement and disablement of layers is performed through a system call. The system drivers control the access of applications to the file system through the enabled layers, generally without requiring significant access to the system disk or other storage. In those systems the installation and de-installation of an application can be as simple as enabling or disabling a containing layer, without requiring the installation or removal of the applications files from a hard disk. In those systems, time consuming snapshot utilities become unnecessary.

In one preferred system, layering only applies to files located to fixed disks and network drives, each layer spanning one or more fixed disks. In that system removable disks should not generally be layered, as a layer generally pertains to the persistent files and configuration required to operate an application or user environment. It is expected that under most circumstances user files should be permitted to be saved to a floppy disk or CD-RW, for example, so a user can transport his data files to another computer. Likewise, areas on a fixed disk may also be reserved for user or other files to be excluded from layering, for example a "my documents" directory, as desired.

In some systems it will be advantageous to distinguish layers into a "read-only" and "read-writable" portions, the read-only portion containing files and configuration as originally installed and the read-writable portion containing additions, deletions and modifications to the original installation. In some circumstances these layers may be referred to as the install portion (read-only) and the user (read-write) section. A read-writable portion may be global to all users of a computer. Alternatively a read-writable portion may be provided for each user of a computer, each read-writable portion being protected from access by other users.

Some systems may provide a multi-user environment providing a facility for an administrator to designate layers accessible to individual users and another facility to automatically enable layers on user login and disable layers after a user has logged off. In those systems an administrator may provide layers accessible to all users or some users. Other layers may be provided accessible only to an individual user. In a subset of those systems a writable layer is provided for each user, providing data protection and isolation between users.

A single layer having a read-only and a read-writable portion is equivalent to two layers, one of which is write protected. In alternate systems, read-only and read-writable layer portions are individual peer layers; those layer definitions containing a reference to the accompanying peer layer.

In some layered systems, layers may be stacked on top of each other, with the true file system at the bottom of the stack. If files of the same name and location exist in multiple layers, or in the base file system, rules can be provided whereby the layered system can determine which file to present to an application. In some systems, layers include dependency information. That dependency information may include a list of layer identifiers which are required to be enabled when a particular layer is enabled. Dependencies may be asserted when a layer is created, by recording the layers enabled on a layered system at the time of layer creation. The layering system software may automatically enable all dependent layers when a particular layer is enabled.

For ease of configuring and managing a layering system, a manager application may be provided. The manager application permits an administrator or user to control the presentation of applications and data on a system, as well as other functions. A manager application may have facilities for importing and exporting layers, using a standard layer archive format. That archive format will advantageously be compressed, and may use standard archiving formats, for example those used by 'zip' or 'tar' type applications. A manager application provides a logical place to contain a facility for changing layered system software settings. A manager application might provide a viewer to view information about a layer. Likewise, a layer editor may be provided to edit certain layer information as desired. An editor might also be provided whereby registry settings and files can be added, removed, or changed in a layer. A facility for selecting, enabling, and disabling layers and layer groups may also be provided. Likewise, a facility for defining and editing layer groups may be included, as well as layer dependency information. A facility for deleting and installing layers may also be provided in that manager application. That application may also include an interface to cause layered system software to enter and exit capture modes.

It may also be desirable to provide a startup layer enablement function, whereby the computing system starts up a group of layers based on layer configuration. This will be especially helpful where it is desired not to provide users with non-layered access to the underlying file system and registry, for example in public settings.

It may optionally be desired to include variable handling with regard to file system paths and registry paths. The location of a file or registry setting specified in a layer may include one or more variables, so as to permit relocation of that object. A variable may be denoted in many ways, for example by surrounding the variable name with percent "%" characters. The source of some variable names and values may be from the environment. For example, Windows operating systems set the "WINDIR" environment variable to the location of the OS system subtree, for example C:\windows. Including the WINDIR variable in a path may permit files of a layer to be moved from one Windows system to another, especially if the OS system subtree resides in different locations on the computers. Other variable values may be supplied at runtime, for example a "CURRENTUSER" variable. In that example, the CURRENTUSER variable is set to a user's login name while that user is logged in. One use of the CURRENTUSER variable is to provide a layered file reference for a global file that appears in each user's profile directory. Yet other variable names and values may be stored in a layer definition. A manager application may provide editing facilities for changing those layer-defined variables, and for editing the pathnames of virtual files.

Layer Creation Modes

Layer creation modes may be provided in a layered system to create new layers through a "capture" operation. A capture operation is generally started and ended, and uses the layering software to intercept operations that install, delete, rename or modify files and configuration such as a registry. If the layering system supports layers having both a readable and read-writable portion, the capture operation may record changes to the readable portion; that readable portion becoming effectively locked when the capture operation is ended. During the capture operation changes made by the installation procedure do not affect the base system, but are rather recorded to the new layer.

A first layer creation mode is simply called "capture" mode. When that mode is enabled, all operations by any application to create, modify or delete files are entered into a layer. This mode is especially helpful in situations where it is desirable to create a new layer for one or more applications to be installed to the computing system. In an example of a capture mode operation on a Windows platform, a user first enables capture mode. The user then executes an application installation program. During the install, all of the applications shared DLLs, registry entries, and .ini files that would be directed to the Windows system directories become trapped in the capture layer. Application files that would be placed on file systems managed by the OS are also redirected into the layer. All of the captured data is held separate from the regular OS either locally or remotely in a data file, hard disk partition, or some other container.

A second layer creation mode is referred to as "capture by PID" mode. That mode is similar to "capture" mode, with the difference being that only changes made by a particular process ID (PID) or one of its child PIDs are captured.

A third layer creation mode is called "delete capture" mode. This mode may be thought of as the inverse of "capture" mode. Delete capture mode is intended to track all of the file system and registry deletions that occur and place those files and registry entries into a new layer. The software (driver) is hooked into the system so that operations that delete, rename, or modify file system or registry so they can be copied to the capture layer before they are modified. This mode may be particularly helpful to create a layer of an already installed application. The user enters "delete capture" mode, following which the user activates the application's deinstallation program. As the application's uninstall program removes files and registry settings, they are copied to the new layer. When the uninstall is complete, the user exists delete capture mode. At that time the application does not exist in the regular file system or registry, but can be activated by the user as it appeared before the uninstall operation by activating the newly created layer.

A fourth layer creation mode is called "delete capture PID" mode. That mode operates in similar fashion to delete capture mode, with the difference that only changes made by a particular PID and child PIDs are tracked, rather than system-wide changes.

A system supporting layering need not implement a capture mode if an alternate layer delivery mechanism is provided, for example a layer import operation or a simple file or file system copy.

Use: Application Installation Generator

Many application installer programs have the ability to create an application install via a "capture" or "snapshot" process. This process typically involves comparing the state of the computer system before and after an application install and generating the install information based on the differences. In a system supporting layers, an application may be captured as outlined above, creating an installation layer. Because changes are tracked as they occur, no state comparison needs to be done, saving time. In addition, it is usually recommended that the "capture" operation be performed on a "clean" or "virgin" system, so the capture process can capture all the necessary system changes (i.e. won't miss changes due to application pieces being left over from prior installations.) This requires the user to reinstall the operating system to get the system into the desired clean state. A layered system may be made clean by disabling all layers created during installation capture procedures (assuming all install operations have occurred under capture operations.) After capture of an installation layer, that layer can be used to install the application at another computer supporting layers, or the information can be extracted from the layer to provide a file manifest for other installation programs.

Use: Software Installation/Uninstallation

Layers can be advantageously used to provide an installation for an application that is relatively easy to uninstall. A software vendor builds an application CD (or other media), first using a capture mode to record a layer of the application installation. That layer is then exported to a file, which file is then combined with an installation program for the layering system software, for example to a compact disc. The compact disc will contain an installation program, which for example might be called 'setup'. The setup program operates first to install the layering system software, and then import the layer exported to the compact disc into the destination system. At that point, the subject application is then installed to the destination system, but isolated in a layer. Because it is isolated, it is protected from corruption from other applications or meddling, and thus it remains in a known and reliable state, potentially reducing the number of technical support calls.

It is probably desirable to include a banner screen advertising the layering system software product and providing contact information for product inquiry and support. It may also be desirable to include a layer manager application with the layering system software to allow a user to enable and disable the application layers or other installed layers, but that is not necessary for a simple demonstration product.

As the application is used, it may be desired to record changes to the virtual file system into the writable portion of a layer. Alternatively, it may be desirable to record some user files to the underlying file system so those files could be retained if the application layer was deinstalled or removed, as might be the case for word processing files, CAD files, etc. The software installer may be given the option to record the software installation of an application layer into a readable-only portion, so the user cannot inadvertently or otherwise damage the application installation.

At some point, it may be desired to remove the application. To do so, the user removes the layer from his computer, which deinstalls the application and any files or changes made to the virtual file system. Uninstalling the layering system software is optional, as the presence of that software would not adversely affect the use of the destination system.

Through that method, software creators may create a demo version of their software. These versions might be used to give the end user experience with a software product before a purchase is made. The advantage of removing changes to the virtual file system is significant, as many applications do not uninstall cleanly and leave residual files and changes.

Optionally, functionality might be built into the layering system software that disables the application layer after a period of time. After such a disabling, a user would have the option of removing the application layer, or purchasing a license for use of the application. The license would presumably be accompanied with a license key or other authentication feature verifiable by the layering system software.

In another alternative configuration, an application layer is never transferred to a resident fixed disk, but rather remains resident on the vendor product, compact disc or otherwise. In that configuration the application layer can only be activated if the vendor product is readable in a media drive, and little or no space is taken on resident file systems for the application installation.

Use: Secure Applications

Applications can be protected from unauthorized access through the use of a layered system. In a first situation, it is desired to protect application files from viewing and copying, for which one solution is described. The layering system software of a suitable system has an additional feature by which a layer may include an authentication key or token. Any application of the computing system desiring to open files within the layer must supply a token to the layering system software before access is allowed. The PID of an authenticating application may be tracked so that only one authentication step is required. The application layer may additionally be encrypted, the layering system software performing decryption and encryption steps at runtime as the application layer is accessed. That system is advantageous in that only the data of a particular application need be encrypted, reducing the complexities of bootstrapping into an encrypted file system and modifying system applications to support encrypted system files.

In that system authenticating applications will have access to the application files, but not applications not having a valid authentication token. The authenticating applications can be constructed such that limited access is permitted to the application files, as desired by the programmer. For example, an application may store a license key to one of the application's files. If access were permitted to that file, an unscrupulous user could copy that license key to a second computer providing illicit access to the application software stored thereon. The authenticating layered system software is installed to the computer, and an application layer is constructed and installed to the computer, that layer encrypted using a key constructed with information specific to the computer, for example a volume label or Ethernet MAC address. A second application installed to the computer, for example Windows Explorer, cannot view the application layer files because it does not possess the correct authentication key. A user is thereby prevented from copying or otherwise accessing the application files, providing security for the software vendor.

In a second situation, it is desirable to protect the software from execution by unauthorized individuals. In that system, the layering system software has a facility for authenticating a user before enabling a layer.

Other Uses

Another use for a layering system is to have layers that represent different environments on a system. For example, a user could have an Office and a Gaming layer, each providing an environment with it's own icons and menus.

In another use, multiple versions of a software product are installed on a computer, each isolated in a layer. A user may enable a particular layer and use the corresponding version of the software product without having to de-install and re-install the application. This use may be especially helpful where an older version of a software product supports a function desired but not supported in a newer version, for example, the importation of older word processing file formats. This use would also be useful to software product testers, who in the course of testing verify software functionality against multiple development versions. In that use the repeated unstalling and reinstalling or cleaning and reinstalling operations are avoided.

Example Implementation

Example systems are provided of an application layering system under a 32-bit Microsoft Windows architecture, such as Windows 95, 98, NT, 2000, and XP. In those system a layering system is formed by adding several files to the stock Windows operating system, those files including a runtime library FSLLIB32.DLL, a compression/archiving library, and an FSLX driver which is either an FSLX.VXD driver (for 95/98/ME based platforms) or an FSLX.SYS driver (for NT based platforms). The addition of those files is performed using an installation program. The example layering system provides a user with the ability to contain third party application installations into a "file system layer" or FSL. The example system provides the modes of "capture", "capture by PID", "delete capture", and "delete capture PID".

Depicted in FIG. 3 are components of the example layering computer system. An operating system 314 is installed to a computing device, that operating system having subsystems for handling a registry 316 and a file system 318. An FSL system driver is installed "on top" of the operating system 314 in order to have first processing priority for registry and file system accesses. An FSL management application 300 provides an administrator an interface to interact with the FSL system driver 312, change its configuration, and make changes to layers. An FSL API library 306 provides a convenient interface for the management application 300 to attach to the FSL system driver 312. At certain times, FSL management application 300 provides notices to the Windows Explorer 302 notifying that application that the contents of a mounted file system have changed. Other applications 304 may interact with the system, performing read and write operations to the file system and registry, through the FSL system driver 304. A compression library 310 may be provided to compress layer information, especially for layer archives exported by the system.

A "lazy thread" is utilized to perform low priority tasks. That thread wakes up occasionally to delete layers that are marked for deletion and write out delete lists that have changed. The execution of the lazy thread may be deferred for a short time if the system is busy.

In the example systems there is a key in the registry under HKEY_LOCAL_MACHINE\SYSTEM called FSLogic\FSL where registry settings describe each layer and its settings. The SYSTEM portion of the registry is used because it is available very early in the boot cycle. Each layer has the properties outlined in the following table:

| Property/Value | Meaning/Function |
| --- | --- |
| Active | Non-zero indicates that the layer is enabled |
| ActiveOnStart | Non-zero indicates the layer should be enabled when the FSLX driver loads. |
| FileRedirect | The path to the location in the file system that contains the file system virtual files. |
| MajorVersion | The major version of the layer format. |
| MinorVersion | The minor version of the layer format. |
| Peer | The name of the peer layer. |
| ReadOnly | Non-zero indicates that the layer is read only, or the readable portion of a peer layer combination. |
| RegRedirect | Path to the location that contains the virtual registry settings for the layer. |
| Type | Layer type. |
| ShouldDelete | Non-zero value indicates that the layer should be deleted. This value is read by the lazy thread to know if the layer should be deleted. |

Also under HKEY_LOCAL_MACHINE\SYSTEM under a key called fslrdr is kept all registry information contained in each layer. Under fslrdr there is further a key for each layer defined in the system. Under each layer key each of the HCC, HCR, HCU, HLM, and HU keys are present. These keys correspond to HKEY_CURRENT_CONFIG, HKEY_CLASSES_ROOT, HKEY_CURRENT_USER, HKEY_LOCAL_MACHINE, and HKEY_USERS respectively. The structure of the registry under these keys mimics the regular structure of the system registry.

When a layer is active, all of the keys and values for the layer are overlaid on the normal registry. For example, a layer "TEST" is defined on a system and has a registry entry "HKEY_LOCAL_MACHINE\SYSTEM\fslrdr\TEST\HLM\Software\XYZCorp". When that layer becomes active, the following key would appear in the registry: "HKEY_LOCAL_MACHINE\Software\XYZCorp".

The FSLX.SYS and its counterpart FSLX.VXD operate to intercept key file system and registry calls and manipulate the results to create the appearance that virtual files and registry settings contained in the layer definitions exist in the real file system and real registry. When requests come that access virtual files or virtual registry settings, these requests are redirected by the FSLX driver to the proper locations in the layer. The FSLX driver also accepts IOCTLs from FSLLIB32.DLL that control the state of the driver. The following table outlines a set of IOCTL commands available through the FSLX driver:

| IOCTL | Description |
| --- | --- |
| Version Query | Returns the driver version. |
| Begin Capture | Causes the driver to enter "Capture" mode. |

-continued

| IOCTL | Description |
| --- | --- |
| End Capture | Causes the driver to exit "Capture" mode. |
| Begin Delete Capture | Causes the driver to enter "Delete Capture" mode. |
| End Delete Capture | Causes the driver to exit "Delete Capture" mode. |
| Activate Layer | Activates a specified layer. |
| Deactivate Layer | Deactivates a specified layer. |
| Rename Layer | Notifies the driver that a layer has been renamed. |

For each read or write request to a file system or registry, an owner layer is determined. The owner layer is determined by a sequence of steps. First, if the driver is in Capture mode, the owner layer is the layer being captured. Second, if the driver is in PID Capture mode, and if the PID of the requesting process is the PID being captured or a child PID of the PID being captured, the owner layer is the layer being captured. Lastly, if the driver is not in a capture mode, and if the PID of the requesting process is a PID of an executable whose executable file is in a layer, the owner layer is the layer where the executable file resides.

Because multiple layers can be active at the same time and those layers may contain entries that overlap, rules are defined to determine the order layers are considered by the driver. Different modes require different search rules. If the system is in capture mode, the owner layer is defined to be the layer specified as the capture layer. Otherwise, the owner layer is defined to be the layer that a particular process started from, as may be determined by traversing upward the PID parent/child chain. For example, suppose layer A contained B.EXE. When B.EXE executes, it results in process C running. The owner layer for process C is then layer A.

When the FSLX driver loads, the following is performed: (1) all mutexes and lists are initialized, (2) a device is created used for API DLL communications, (3) a symbolic link that allows for the device object's access from Win32 programs is made, (4) all of the file system entry points are hooked in, (5) the drives to be redirected (C:, D:, etc.) are hooked in, (6) all of the Registry entry points are hooked in, (7) the lazy thread is started.

The FSLX driver uses the following structures and hooks the following entry points in the file system and Registry system code:

Structures used:

FSLX_DELETE_ENTRY_REMOVE: Holds information about an entry on a delete list that may be removed later, for which all necessary information will not be available at the time of removal.

FSLXDELETIONCANDIDATE: Holds information about a file that should be later marked as deleted.

PFSLXOPENREGHANDLE: Holds information about all currently open registry handles.

FSLX_PFO_ENTRY: Holds information about an open directory, the information including a pointer to the file object, a handle to the directory, and the directory path.

FSLX_RENAME_ENTRY: Holds information about a rename operation that is used to create a delete entry.

FSLXREGOPENKEY: Holds information about an open key in a layer, including a handle to the key.

SH_RET_ENTRY: Holds the name of a file. These file names may have already been returned in a query routine. This structure is retained to ensure the same name is not returned more than once if the same file exists in multiple redirection areas.

FSLXSHADOWHANDLE: Holds information about an open directory handle. Among other things, it may contain a list of FSLX_PFO_ENTRYs that correspond to directories in applicable layers.

FSLXSHADOWKEY: Holds information about an open registry key. Among other things, it may contain a list of FSLXREGOPENKEY structures that correspond to keys in applicable layers.

File System Calls:

IRP_MJ_CLEANUP: If there is an FSLX_DELETE_ENTRY_REMOVE structure associated with the parameter referenced File Object, free it. If there is an FSLXDELETIONCANDIDATE structure associated with the parameter referenced file object, add a delete entry for the file and free the structure.

IRP_MJ_CLOSE: Free the FSLXSHADOWHANDLE structure associated with the parameter referenced File Object by: (1) removing the shadowHandle from the list, (2) getting a pointer to the shadowhandle using the File Object, (3) decrement the reference count of the shadowHandle, (4) if the reference count is greater than zero, return success, otherwise (5) free the originalPath member of the shadowHandle, (6) for each FSLX_PFO_ENTRY: remove the entry from the list, free the file path, dereference the File Object, close the directory handle, and free the FSLX_PFO_ENTRY structure, (7) for each SH_RET_ENTRY: remove the entry from the list and free the name and structure, (8) free the search string, and (9) free the structure.

IRP_MJ_CREATE: Get the full file name and full parent directory path for the request. Determine if the File Object represents a file or a directory. If the File Object represents a directory, determine if it represents the root directory. Check to see if this is a reentrant call for which the SL_OPEN_TARGET_DIRECTORY bit in currentIrpStack->Flags should be set. If this is a reentrant create, get the shadowHandle object for this File Object, increment the reference count on the shadowHandle if there is one, and return. Determine the owner layer. If the path of the file being opened is in a redirected area, and if the file that is being created is on the delete list, create and fill in an FSLX_DELETE_ENTRY_REMOVE structure and return. The completion routine for that operation checks to see if the create was successful and, if so, removes the delete entry from the delete list. Check to see if the create is for a *.Config or a *.Manifest file. If it is, set a flag, for which at the completion of this routine if the return code is STATUS_OBJECT_PATH_NOT_FOUND the return code is changed to STATUS_OBJECT_NAME_NOT_FOUND. If the request is for a directory, do (1) if a shadowHandle already exists for the parameter referenced File Object, increment it's reference count, (2) if a shadowhandle does not exist, create one with all entries initialized to default values, and for each layer that contains a corresponding directory or delete entries that correspond to the directory, create an FSLX_PFO_ENTRY entry. Determine if the parameter referenced request should be redirected: (1) if the request is a write request and capture mode is enabled, do (a) make sure the parent directory is in the layer being captured, (b) if the parameter referenced request is to a file and if a delete entry exists for the file, create an FSLX_DELETE_ENTRY_REMOVE structure so that the delete entry can be removed if this operation is successful, (c) if the parameter referenced request is to a file and if a delete entry does not exist for the file, use the standard search order to locate and copy any existing file to the writable portion of the layer being captured, and (d) redirect the create to the writable portion of the layer being captured and return; (2) if no layers have the directory and it is an open (not a create), don't redirect and return from the function call; (3) if there is no owner layer, do: (a) if the request is a write request, don't redirect and return from the function call, (b) if the request is a read request, find a first file by iterating through each layer in the search path, and redirect to that file unless the file is on a delete list; (4) if an owner layer can be identified, and if the request is a write request: (a) make sure the directory path exists in the writable section of the owner layer, (b) if the parameter referenced request is to a file, and if a delete entry exists for the file, create an FSLX_DELETE_ENTRY_REMOVE structure so that the delete entry can be removed upon function call completion, (c) if the parameter referenced request is to a file, and if no delete entry exists for the file, use the standard search order to locate and copy any existing file to the writable portion of the layer being captured, and (d) redirect the writable portion of the layer being captured and return; and (5) if an owner layer can be identified, and if the request is a read request, find a first file by iterating through each layer in the search path, and redirect to that file unless the file is on a delete list. If the file that is being opened is on the delete list, return STATUS_OBJECT_NAME_NOT_FOUND. If the open is being performed with the FILE_DELETE_ON_CLOSE flag, and if the parameter referenced file is a file that should be protected from delete, (1) clear the FILE_DELETE_ON_CLOSE flag, and (2) create an FSLXDELETIONCANDIDATE structure, later used in the completion routine to add a delete entry for the file. Return a value that indicates success or failure.

IRP_MJ_CREATE: (completion routine) If the create operation is being canceled, free the shadowHandle if one exists, free any existing FSLXDELETIONCANDIDATE and return. If the create operation failed, free any existing shadowHandle and FSLXDELETIONCANDIDATE and return. If an FSLX_DELETE_ENTRY_REMOVE exists, use it to remove the delete entry from the delete list.

IRP_MJ_DIRECTORY_CONTROL: If the minor function code is IRP_MN_QUERY_DIRECTORY, (1) get the shadowHandle for the File Object, (2) if there is no shadowHandle, return, (3) if the root directory is being enumerated, do not return "." or ".." entries, (4) enumerate the corresponding directories in each layer and the real directory. Use SH_RET_ENTRY structures to make sure duplicate entries are not returned.

IRP_MJ_SET_INFORMATION: If the FileInformationClass is FileDispositionInformation, if the file is being deleted, and if it is a file that should be protected from deletion, create an FSLXDELETIONCANDIDATE structure to be used in the completion routine to add a delete entry for the referenced file. Otherwise, if FileInformationClass is FileRenameInformation, do the following: (1) if the requested operation is a rename operation on a protected file that should succeed, copy the source file to the writable section of the owner layer and create a delete list entry for the source file, (2) if the requested operation is a rename operation on an unprotected file, perform the rename operation and create an FSLX_RENAME_ENTRY entry for the source file.

IRP_MJ_SET_INFORMATION: (completion routine) If FileInformationClass is FileRenameInformation, and if there is an FSLX_RENAME_ENTRY, use the contained information to create a delete entry for the source file of the rename operation. If FileInformationClass is FileDispositionInformation, do: (1) if the operation was successful and the file was deleted, get the FSLXDELETIONCANDIDATE structure, and if the deleted file was not in the writable section of the owner layer, cancel the deletion, (2) if the operation was successful and the delete operation was canceled, remove any existing FSLXDELETIONCANDIDATE, or (3) if the operation was unsuccessful, and if a deletion was being attempted, remove any existing FSLXDELETIONCANDIDATE.

Registry Calls:

RegCloseKey: If this call is re-entrant, pass the call parameters to the OS. Since all NtClose calls come through this hook and not just RegCloseKey calls, make sure that this call is a close for a registry handle. If not, pass the call parameters to the OS. Get the shadowKey structure. If there exists a shadowKey, (1) free the shadowKey and all FSLXREGOPENKEY structures by closing the handle to the key and freeing the structure, and (2) if the main key handle has not been closed, close it. If there is no shadowKey, close the handle. Remove any PFSLXOPENREGHANDLE.

RegCreateKey: If this call is re-entrant, pass the call parameters to the OS. If requesting in a redirected part of the registry, pass the call parameters to the OS. Get the PID of the caller. If there is a delete entry corresponding to the requested create operation, (1) create a new key in the writable section of the owner layer, (2) if unable to create the key, return an error, (3) change the disposition to REG_CREATED_NEW_KEY, (4) create a new shadowKey structure for the created key, (5) determine the owner layer for the key, (6) if there is an owner layer (a) allocate a new FSLXSHADOWKEY structure and initialize with default values and (b) create an FSLXREGOPENKEY entries for applicable layers, (7) if the key does not exist in the base registry, but does in one or more layers, create a user mode handle to be returned to the calling application, and (8) remove the delete entry. Otherwise if there is no delete entry corresponding to the requested create operation, continue. Create a shadowKey structure. Determine the owner layer for the key. If there is an owner layer (1) allocate a new FSLXSHADOWKEY structure and initialize with default values, and (2) create FSLXREGOPENKEY entries for applicable layers. If the key does not exist in the base registry but it does in one or more layers, create a user mode handle to be returned to the calling application. If the key can be opened (not created), set the disposition to REG_OPENED_EXISTING_KEY, create a new PFSLXOPENREGHANDLE and return. If creation of a key in the writable section of an owner layer is successful, do: (1) set the disposition to REG_CREATED_NEW_KEY, (2) create a PFSLXOPENREGHANDLE, and (3) return. If the error code from the creation attempt was STATUS_OBJECT_PATH_NOT_FOUND, return STATUS_OBJECT_PATH_NOT_FOUND. If a key was not created in the writable section of an owner layer, attempt to create the key in the base registry, create a PFSLXOPENREGHANDLE, and return.

RegDeleteKey: If this call is re-entrant, pass the call parameters to the OS. Otherwise, if there is an owner layer, do: (1) if the key has child keys, return STATUS_ACCESS_DENIED, or (2) if the key has no child keys, create a delete entry for the key. If there is no owner layer, do: (1) if there is a shadowKey, delete the key from the base registry and add delete entries to all layers, or (2) if there is no shadowKey, delete the key from the base registry.

RegDeleteValueKey: If this call is re-entrant, pass the call parameters to the OS. Otherwise, if there is an owner layer, create a delete entry for the value. If there is no owner layer, delete the value from the real registry and create delete entries for all applicable layers.

RegEnumerateKey: If this call is re-entrant, pass the call parameters to the OS. Otherwise, if there is a shadowKey, (1) enumerate through the read registry and applicable layers, (2) store state information in the shadowKey. Do not return duplicate entries. If there is no shadowKey, pass the call parameters to the OS.

RegEnumerateValueKey: If this call is re-entrant, pass the call parameters to the OS. Otherwise, if there is a shadowKey, (1) enumerate through the read registry and applicable layers, (2) store state information in the shadowKey. Do not return duplicate entries. If there is no shadowKey, pass the call parameters to the OS.

RegFlushKey: If this call is re-entrant, pass the call parameters to the OS. If there is a shadowKey, flush the real registry key and all applicable layer keys. Otherwise, pass the call parameters to the OS.

RegOpenKey: If this call is re-entrant, or if the key is in the redirection area of the registry, pass the call parameters to the OS. Otherwise, get the caller's PID. If there is a delete entry for this open, return STATUS_OBJECT_NAME_NOT_FOUND. Create a shadowKey. Try to identify an owner layer. If an owner layer can be identified, (1) allocate a new FSLXSHADOWKEY structure initialized with default values, (2) create FSLXREGOPENKEY entries for applicable layers, and if a key does not exist in the base registry but it does in one or more layers, create a user mode handle to be returned to the calling application. If the open operation was successful, create a PFSLXOPENREGHANDLE.

RegQueryKey: If this call is re-entrant, pass the call parameters to the OS. If there is no shadowKey and the request is of class "KeyNameInformation", get the key name and if it is the name of a redirect key, change it to the base name. If there is a shadowKey and there is a delete entry found for this key, return STATUS_OBJECT_NAME_NOT_FOUND. If there is a shadowKey and. there is not a delete entry for this key, query the real registry key and all applicable layer keys. Depending on the class of query, combine the results and return them to the user.

RegQueryValueKey: If this call is re-entrant, or if there is no shadowKey, pass the call parameters to the OS. If there is a delete entry for this value, return STATUS_OBJECT_NAME_NOT_FOUND. Otherwise, if there is a shadow key, use the standard search order to find the value to return.

RegSetValueKey: If this call is re-entrant, or if there is no owner layer, pass the call parameters to the OS. Otherwise, set the value in the writable portion of the owner layer. If the setting operation was successful, remove any delete entry for the value and return.

In the example systems the FSLLIB32.DLL runtime library provides an API that may be used by other applications to manage the layered system and communicate with the FSLX driver, and further provides system management function implementations. That library includes functions to load and unload the FSLX driver, identify version information for itself and FSLX driver; begin and end Capture mode; begin and end Delete Capture mode; import and export layers; create, delete, rename and merge layers; activate and deactivate layers; get layer information; enumerate layers; enumerate the files of a layer; enumerate the registry entries of a layer; manipulate the registry entries of a layer; enable and disable layers; set and unset an "active on start" layer property, create and delete layer groups; enumerate layer groups; add and remove layers from layer groups; verify system integrity; enumerate layer variables; create and delete layer variables; and delete the writable portion of a layer and create a new, empty writable portion. A discussion of the individual exported functions follows with greater specificity, using C language prototypes:

| Function | Description |
| --- | --- |
| FSLActivate(<br>    PTCHAR fslName) | Validates the fslName against defined layers. If corresponding layer or group is defined, get information. If fslName corresponds to a group, recursively call FSLActivate for each layer in the group. Communicates with FSLX driver via an IOCTL to active the layer. Notifies the Windows Explorer that classes may have changed. For each virtual directory contained in the newly activated layer, notify the Windows Explorer that the directory contents have changed. Applications in the layer that are specified to be run on system startup (in win.ini, registry, startup folder, etc.) are started. Return a value indicating success or failure. |
| FSLAddLayerToGroup(<br>    PTCHAR fslName,<br>    PTCHAR groupName) | Verifies that both the specified layer and group are defined. Creates a subkey under the group key with the name of the layer, adding the layer to the group. Return a value indicating success or failure. |
| FSLAddVariable(<br>    PTCHAR fslName,<br>    PTCHAR varName,<br>    PTCHAR varValue) | Verifies the specified layer is defined. Open the variables key for the specified layer. Set a registry value using the provided varName and varValue. Return a value indicating success or failure. |
| FSLCreate(<br>    PTCHAR fslName,<br>    BOOL createPeer) | Verifies the specified layer is not defined. Create a layer definition with default values. Create the layer redirection area in the file system(s). If createPeer is true, recursively call FSLCreate for the peer with createPeer set to FALSE, and set the peer entries in the layers to point to each other. Return a value indicating success or failure. |
| FSLCreateGroup(<br>    PTCHAR groupName) | Validates groupName. If the group already exists, return an error. Create a new group named groupName under the group key HKEY_LOCAL_MACHINE\SYSTEM\FSLogic\groups) Return a value indicating success or failure. |
| FSLDeactivate(<br>    PTCHAR fslName,<br>    BOOL force,<br>    PDWORD pPid) | Validate fslName, and get information about the corresponding layer or group. If fslName corresponds to a group, recursively call FSLDeactivate for each layer of the group. If fslName corresponds to a layer, communicate with the FSLX driver through an IOCTL to deactivate the layer. If the FSLX driver returns an error that there is a PID running from this layer and force is true, kill the PID corresponding to pPid. Return a value indicating success or failure. |
| FSLDelete(<br>    PTCHAR fslName,<br>    BOOL deletePeer,<br>    BOOL force,<br>    PDWORD pPid) | Validates fslName. If the corresponding layer does not exist, or if the corresponding layer has not been deactivated, return an error. If deletePeer is TRUE, recursively call FSLDelete with the name of the peer layer, with deletePeer set to FALSE. Mark the layer as deleted. Remove the fslrdr registry branch for the corresponding layer. Remove the layer from any group entries. Return a value indicating success or failure. |
| FSLDeleteGroup(<br>    PTCHAR groupName) | Validates groupName. Deletes the group key and any subkeys or values. Return a value indicating success or failure. |
| FSLDeletePeer(<br>    PTCHAR fslName,<br>    BOOL force,<br>    PDWORD pPid) | Validates fslName. Finds the peer for fslName. Calls FSLDelete using the found peer name. Return a value indicating success or failure. |
| FSLDeleteVariable(<br>    PTCHAR fslName,<br>    PTCHAR varName) | Validates fslName. Delete any variable/value pair from the layer's variables key. Return a value indicating success or failure. |
| FSLEnable(<br>    PTCHAR fslName,<br>    BOOL bEnable) | Validate fslName, and get information about the corresponding layer or group. If fslName corresponds to a group, recursively call FSLEnable using the same bEnable for each layer of the group. If fslName corresponds to a layer, set the enabled value of the corresponding layer based on bEnable. Return a value indicating success or failure. |
| FSLEndCapture(<br>    PTCHAR fslName) | Validate fslName. Communicates with FSLX driver through an IOCTL call to cause the driver to exit capture mode. Notifies Windows Explorer that classes may have changed. For each directory contained in the newly activated layer, Windows Explorer is notified that the directory contents have changed. Return a value indicating success or failure. |
| FSLExport(<br>    PTCHAR fslName,<br>    PTCHAR archivePath,<br>    BOOL replaceIfExists,<br>    PTCHAR errorStr,<br>    void (__stdcall<br>*RTInfoFunc)(PFSL_IMP_EXP pImpexp),<br>    BOOL bInitialCall) | Validate fslName, and get information about the corresponding layer or group. If bInitialCall is TRUE, perform a number of initialization steps including (1) validating the archivePath, (2) testing for the existence of an archive file in the archivePath directory, (3) if the replaceIfExists flag is FALSE, returning an error if an archive file already exists in the archivePath directory, (4) if the replaceIfExists flag is TRUE, deleting an archive file located in the archivePath directory, (5) if fslName corresponds to a layer having a peer layer, recursively calling FSLExport once for both the corresponding layer and the peer layer with bInitialCall set to FALSE, followed by closing the archive file. Otherwise, if fslName corresponds to a layer group, perform a |

-continued

| Function | Description |
|---|---|
| | number of steps including (1) for each layer of the group, recursively calling FSLExport for each layer and any existing peer layer to each layer with bInitialCall set to FALSE, (2) storing the group name in the archive, (3) placing a version number in the archive, and (4) closing the archive file. If bInitialCall is FALSE and fslName corresponds to a layer, perform the steps of (1) creating a new archive file if it has not yet been created, (2) opening the archive file, (3) exporting the fslrdr portion of the registry of the layer to a new file, (4) exporting the layer definition in the system registry to a new file, (5) creating a file designating the name of the layer, (6) adding all of the created files in the previous three steps plus the files in the redirection area of the file systems of the layer to the archive, (7) placing a version number in the archive, (8) closing the archive file, and (9) removing the exported registry files and layer name designation file. Return a value indicating success or failure. |
| FSLFindClose(<br>HANDLE hFindFile) | Call FindClose (of the WIN32 API) using hFindFile. Return a value indicating success or failure. |
| FSLFindCloseGroup(<br>PFSL_FIND *groupFind) | Close the registry key in groupFind. Return a value indicating success or failure. |
| FSLFindCloseLayer(<br>PFSL_FIND *fslFind) | Close the registry key in fslFind. Return a value indicating success or failure. |
| FSLFindCloseLayerInGroup(<br>PFSL_FIND *fslFind) | Close the registry key in fslFind. Return a value indicating success or failure. |
| FSLFindCloseVariable(<br>PFSL_FIND *find) | Close the registry key in find. Return a value indicating success or failure. |
| FSLFindFirstFile(<br>LPCTSTR fslName,<br>LPCTSTR lpFileName,<br>LPWIN32_FIND_DATA lpFindFileData) | Validate fslName. Generate a search string including the redirection area of the layer and lpFileName. Call FindFirstFile (WIN32 API) on the redirect search string. Return a value indicating success or failure. |
| FSLFindFirstGroup(<br>PFSL_FIND *groupFind,<br>PTCHAR groupName) | Open the parent key in the registry where all group names are stored (HKEY_LOCAL_MACHINE\SYSTEM\FSLogic\groups). Set the index in groupFind to 0. Find the first group name. Return a value indicating success or failure. |
| FSLFindFirstLayer(<br>PFSL_FIND *fslFind,<br>PTCHAR fslName,<br>BOOL includePeers) | Open HKEY_LOCAL_MACHINE\SYSTEM\FSLogic\fsl. Store the handle to the key in the fslFind structure. Set the index in the fslFind structure to 0. Set includePeers in the fslFind structure to the value of includePeers. Get the first layer name from the registry (layer names are subkeys of HKEY_LOCAL_MACHINE\SYSTEM\FSLogic\FSL). If a layer is marked for deletion, go to the next layer. Skip peer layers if includePeers is FALSE. Return a value indicating success or failure. |
| FSLFindFirstLayerInGroup(<br>PFSL_FIND *fslFind,<br>PTCHAR groupName,<br>PTCHAR fslName) | Open the group registry key under HKEY_LOCAL_MACHINE\SYSTEM\FSLogic\groups. Set the index in fslFind to 0. Get the first layer name from the registry. Return a value indicating success or failure. |
| FSLFindFirstVariable(<br>PFSL_FIND *find,<br>PTCHAR varName) | Open the variables registry key under the layer definition key. Set the index in find to 0. Find the first value (is this a var name or var value?). Return a value indicating success or failure. |
| FSLFindNextFile(<br>HANDLE hFindFile,<br>LPWIN32_FIND_DATA lpFindFileData) | Call FindNextFile (WIN32 API). Return a value indicating success or failure. |
| FSLFindNextGroup(<br>PFSL_FIND *groupFind,<br>PTCHAR groupName) | Increment the index in groupFind. Read the next group name from the registry. Return a value indicating success or failure. |
| FSLFindNextLayer(<br>PFSL_FIND *fslFind,<br>PTCHAR fslName) | Increment the index in the fslFind structure. Read the next layer name from the registry. Skip layers marked for deletion. If the includePeers field in fslFind is FALSE, skip peer layers. Return a value indicating success or failure. |
| FSLFindNextLayerInGroup(<br>PFSL_FIND *fslFind,<br>PTCHAR fslName) | Increment the index in fslFind. Read the next layer name from the group key. Return a value indicating success or failure. |
| FSLFindNextVariable(<br>PFSL_FIND *find,<br>PTCHAR varName) | Increment the index in find. Find the next value (is this a var name or var value?). Return a value indicating success or failure. |
| FSLGetDriverVersion(<br>PDWORD pdMajVersion,<br>PDWORD pdMinVersionstruct) | Communicates to the FSL Driver via an IOCTL call to determine the FSL driver's major and minor version numbers. Sets pdMajVersion and pdMinVersion to the major and minor version numbers of the FSL driver. Return a value indicating success or failure. |
| FSLGetInfo(<br>PTCHAR fslName,<br>PFSL_INFO *pInfo) | Validate the fslName. Set structure pointed to by pInfo to zero. Copy the layer name into the structure. If fslName corresponds to a group, (1) set bIsGroup in pInfo to TRUE, and (2) look at all the layers in the group and set enabled, active, and activeOnStart |

-continued

| Function | Description |
|---|---|
| | flags of the pInfo structure appropriately. Read the active, enabled, activeOnStart, majorVersion, minorVersion, type, and peerName values from the registry and set the corresponding flags of the pInfo structure. Return a value indicating success or failure. |
| FSLGetVersion(<br>    PDWORD pdMajVersion,<br>    PDWORD<br>pdMinVersionstruct) | Sets pdMajVersion and pdMinVersion to the major and minor version numbers of the FSLX driver. Return a value indicating success or failure. |
| FSLGetVariable(<br>    PTCHAR fslName,<br>    PTCHAR varName,<br>    PTCHAR varValue) | Read the value named by varName from the specified layer's variables key into varValue. Return a value indicating success or failure. |
| FSLImport(<br>    PTCHAR archivePath,<br>    BOOL replaceIfExists,<br>    PTCHAR errorStr,<br>    void (__stdcall<br>*RTInfoFunc)(PFSL_IMP_EXP pImpexp)) | Verify the archivepath (the archivepath being the full pathname to the file). Open the archive file. Check the version numbers against what is supported by the FSLX driver (i.e. driver version number > archive version number), returning an error if unsupported. Extract the files that contain the layer and group names. Create each group. For each layer to be imported, perform the following: (1) if a layer of the same name already exists and if replaceIfExists is FALSE return an error, otherwise delete the existing layer, (2) extract all pertinent information for the layer from the archive, (3) delete the file that indicates the layer name, (4) import the registry fslrdr branch for the layer, (5) import the layer definition, (5) mark the layer as enabled, and (6) delete the layer registry information files. Close the archive. Return a value indicating success or failure. |
| FSLInitSystem(void) | Verify the FSL system: (1) make sure HKEY_LOCAL_MACHINE\SYSTEM\FSLogic\FSL exists, (2) make sure major and minor version registry value are created, (3) make sure default file system redirection path and registry redirection path registry values are set, (4) make sure HKEY_LOCAL_MACHINE\SYSTEM\fslrdr exists, and (5) make sure C:\fslrdr exists. Read default file system redirection path. Read default registry redirection path. Return a value indicating success or failure. |
| FSLIsGroup(PTCHAR name) | Validate the name. Determine if name is a valid group by attempting to open the group key under HKEY_LOCAL_MACHINE\SYSTEM\FSLogic\groups. Return a value indicating success or failure. |
| FSLLoadDriver(void) | Verify the FSL system: (1) make sure HKEY_LOCAL_MACHINE\SYSTEM\FSLogic\FSL exists, (2) make sure major and minor version registry value are created, (3) make sure default file system redirection path and registry redirection path registry values are set, (4) make sure HKEY_LOCAL_MACHINE\SYSTEM\fslrdr exists, and (5) make sure C:\fslrdr exists. Loads the driver if it is not loaded. Notifies Windows Explorer via SHChangeNotify that the C:\fslrdr directory has changed. Return a value indicating success or failure. |
| FSLRegCloseKey(HKEY hKey) | Close the registry key. Return a value indicating success or failure. |
| FSLRegCopyKey(<br>    HKEY srcKey,<br>    PTCHAR srcKeyName,<br>    HKEY destParentKey,<br>    BOOL overwrite,<br>    BOOL removeAfterCopy) | Create a new key name under the destination parent key. If the key already existed under the destination parent and overwrite is FALSE, and if copying the values and subkeys from the source would overwrite any values or subkeys in the destination return FALSE. Otherwise, copy the subkeys and values to the destination. If removeAfterCopy is TRUE, delete the registry source key with all of its subkeys and values. Return a value indicating success or failure. |
| FSLRegCopyValue(<br>    HKEY srcKey,<br>    LPCTSTR lpValueName,<br>    HKEY destKey,<br>    BOOL overwrite,<br>    BOOL removeAfterCopy) | If the value already exists under destKey and overwrite is false, return an error. Read the source value and write that value to the destination. If removeAfterCopy is TRUE, remove the source value (what about the source key?) Return a value indicating success or failure. |
| FSLRegCreateKeyEx(<br>    HKEY hKey,<br>    LPCTSTR lpSubKey,<br>    DWORD Reserved,<br>    LPTSTR lpClass,<br>    DWORD dwOptions,<br>    REGSAM samDesired,<br>    LPSECURITY_ATTRIBUT<br>ES lpSecurity Attributes,<br>    PHKEY phkResult,<br>    LPDWORD | Create a registry path to the layer's redirection area using the layer's redirect path, its name, ans lpSubKey. Create the key in the redirection area. Return a value indicating success or failure. |

-continued

| Function | Description |
| --- | --- |
| lpdwDisposition) | |
| FSLRegDeleteKey(<br>    HKEY hKey,<br>    LPCTSTR lpSubKey) | Remove the key and all subkeys and values. Return a value indicating success or failure. |
| FSLRegDeleteValue(<br>    HKEY hKey,<br>    LPCTSTR lpValueName) | Delete the specified value. Return a value indicating success or failure. |
| FSLRegEnumKeyEx(<br>    HKEY hKey,<br>    DWORD dwIndex,<br>    LPTSTR lpName,<br>    LPDWORD lpcbName,<br>    LPDWORD lpReserved,<br>    LPTSTR lpClass,<br>    LPDWORD lpcbClass,<br>    PFILETIME lpftLastWriteTime) | Enumerate the specified key. Return a value indicating success or failure. |
| FSLRegEnumValue(<br>    HKEY hKey,<br>    DWORD dwIndex,<br>    LPTSTR lpValueName,<br>    LPDWORD lpcbValueName,<br>    LPDWORD lpReserved,<br>    LPDWORD lpType,<br>    LPBYTE lpData,<br>    LPDWORD lpcbData) | Enumerate the specified value. Return a value indicating success or failure. |
| FSLRegOpenKeyEx(<br>    PTCHAR fslName,<br>    HKEY hKey,<br>    LPCTSTR lpSubKey,<br>    DWORD ulOptions,<br>    REGSAM samDesired,<br>    PHKEY phkResult) | Create a registry path to the layer's redirect area using the layer's redirect path, its name, and lpSubKey. Open the key in the redirection area. Return a value indicating success or failure. |
| FSLRegQueryValueEx(<br>    HKEY hKey,<br>    LPTSTR lpValueName,<br>    LPDWORD lpReserved,<br>    LPDWORD lpType,<br>    LPBYTE lpData,<br>    LPDWORD lpcbData) | Query the value specified. Return a value indicating success or failure. |
| FSLRegSetValueEx(<br>    HKEY hKey,<br>    LPCTSTR lpValueName,<br>    DWORD Reserved,<br>    DWORD dwType,<br>    CONST BYTE *lpData,<br>    DWORD cbData) | Set the specified value. Return a value indicating success or failure. |
| FSLRemoveLayerFromGroup(<br>    PTCHAR fslName,<br>    PTCHAR group) | Verify that the group exists, and that the layer is a member of the group. Remove the layer from the group by deleting the key with the layer's name from the group key. Return a value indicating success or failure. |
| FSLResetPeer(<br>    PTCHAR fslName,<br>    BOOL force,<br>    PDWORD pPid) | Get the peer name for this layer (writable section of the layer). Get information about the peer. make sure the peer is deactivated. Delete the peer. Create the peer. Point the layer and the new peer layer at each other by setting their peer values in the registry. If the named layer is active, activate the new peer layer. Return a value indicating success or failure. |
| FSLSetActiveOnStart(<br>    PTCHAR name,<br>    BOOL bActiveOnStart) | Verify the name corresponds to an existing layer or group. Get information about the named layer or group. If the name corresponds to a group, recursively call FSLSetActiveOnStart for each layer in the group. Otherwise, set the activeOnStart value for the layer to bActiveOnStart. Return a value indicating success or failure. |
| FSLSetLayerInfo(<br>    PTCHAR name,<br>    PTCHAR fileRedirect,<br>    PTCHAR regRedirect,<br>    DWORD *pType,<br>    DWORD *pReadOnly,<br>    PTCHAR peerName) | Verify that the name corresponds to a layer. Open the registry key that contains the layer definition. If fileRedirect is specified, set the value of the proper registry value. If regRedirect is specified do: (1) set the value of the proper registry value, (2) create the specified redirect path, (3) create the redirect root keys (HLM, HCU, HU, HCC, and HCR). If type is specified, set the value of the proper registry value. If readOnly is specified, set the value of the proper registry value. If peerName is specified, set the value of the proper registry value. Return a value indicating success or failure. |
| FSLStartCapture(<br>    PTCHAR fslName,<br>    BOOL bTrack, | Validates fslName to make sure it is a valid layer name (legal characters, etc.) Communicates to the FSL Driver via an IOCTL to put it into Capture mode. Notifies Windows Explorer that |

| Function | Description |
|---|---|
| DWORD dPid) | classes may have changed. For each directory contained in the newly activated layer, Windows Explorer is notified that the directory contents have changes. Applications in the layer that are specified to be run on system startup are started (there are several places where these can be specified: win.ini, registry, startup folder, etc.) Return a value indicating success or failure. |
| FSLUnloadDriver(BOOL force) | All active layers are deactivated. Unloads the FSLX driver. Notifies Windows Explorer via SHChangeNotify that the C:\fslrdr directory has changed. Return a value indicating success or failure. |
| FSLVerifyBaseSystem(void) | Make sure HKEY_LOCAL_MACHINE\SYSTEM\FSLogic exists. Put the current major and minor version into majorVersion and minorVersion values. Put the default File System rediredction path in a DefaultFileRedirect value. Put the default Registry redirection path in a DefaultRegistryRedirect value. Make sure HKEY_LOCAL_MACHINE\SYSTEM\fslrdr exists. Make sure fslrdr exists at the root of all file systems that will be redirected. Return a value indicating success or failure. |

Each of the above functions returns a value of the type "FSLLIB32_API DWORD _stdcall" indicating success or failure. In the above functions, the TCHAR variable type changes depending on the compilation options. If compiled for Unicode, a TCHAR is a 16 bit entity, otherwise it is an 8 byte char. A BOOL may be represented by a single bit, but is often defined to be a word so as to permit efficient word alignment according to the processor architecture. A DWORD is normally a 32-bit integer. And an LPCTSTR is a long pointer to a constant array of TCHARs.

In the example systems, on each file system volume (C:, D:, etc.) included in the system there is an fslrdr directory at the root of the volume. This directory contains file system information for each of the defined layers. Under the fslrdr directory directories that correspond to each layer are maintained. Under each of those layer directories is a directory that represents the drive letter. Under each of those letter directories the contained directories and file structures mimic the regular structure of the containing drive. When a layer is active all of the directories and files defined for the layer are overlaid on the normal file system. For example, the directory "C:\fslrdr\TEST\c\XYZCorp" is defined under a "TEST" layer. When the "TEST" layer is active, the directory "c:\XYZCorp" appears on the C: drive to all applications running under that layer, and optionally under other layers depending on the implementation details.

Portable Storage Devices Containing Layers

Described above are several examples of portable storage devices containing layers. Portable storage devices might be, for example, NVRAM or Flash memory devices of a portable or pocketable form factor. Other portable storage devices may also be used, for example CD-ROM or CD-RW media with a helical storage structure. Further devices, uses and methods will now be described.

Figure 10:
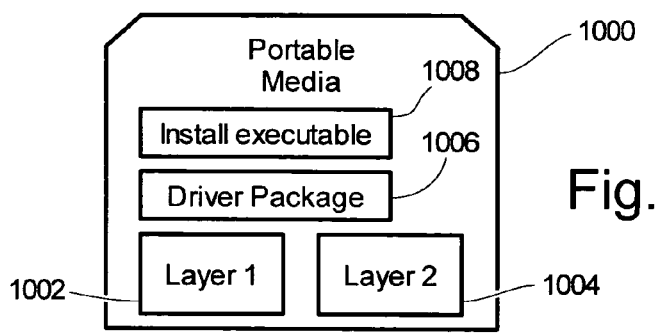
FIG. 10 illustrates a portable media device 1000 is having two layers stored thereon.

Referring now to FIG. 10, a portable media device 1000 is illustrated having two layers 1002 and 1004. This portable media device includes software components for automatically installing layered system drivers contained in driver package 1006 to a Windows-type architecture. To this end, a filesystem formatted on media device 1000 includes an install executable 1008 with a name or other identity recognizable by the host operating system to execute on connection with the portable media. For example, install executable might be named "autorun.exe". Driver package 1006 may be omitted if the drivers are made available otherwise, for example downloadable by a network connection to the Internet.

A procedure of operation of a media device containing a layer as in the example of FIG. 10 is depicted. Beginning with step 1502, a host computer awaits the insertion of a media device, for example a CD-ROM or a USB flash storage device. Upon detection, the host executes step 1504 to attempt to detect an "autorun" configuration element, for example an executable file with a particular name or a script or other configuration file specifying instructions to execute. If, in step 1506, no autorun configuration is found, the host returns to step 1502 to await another media insertion.

Upon determining to autorun the media device, the host locates and executes an installation application, as in step 1508. Now it is the case with some operating systems that auto-run functionality is built-in. For those operating systems without auto-run capabilities, or for those with those capabilities disabled, the installation application may be executed manually, or by a third-party executable or script. The purpose of the installation application is to install layered system drivers to the host operating system and to enable layers located on the media device. Referring to step 1510, the installation application first examines the host system for pre-installed layered system drivers. If the drivers are not detected, they are installed in step 1512. The installation of drivers may be in memory only, and may thereby leave the host's local storage devices unchanged. Alternatively, the drivers may be installed to the host's local storage and loaded into memory therefrom. If that is the case, the installation program may additionally configure the host to load the layered system drivers on system startup, eliminating the need for further driver installations and potentially connecting layers located to portable storage devices more rapidly in the future. Regardless of whether or not layered system drivers where installed in step 1510, the installation application activates those drivers in step 1514.

The installation application may then proceed to enable the layers stored to the portable device in step 1514. The installation application and/or drivers may also activate a write layer on the portable device to receive user data and other virtual changes to the host computer, permitting a user to transport the portable device from one computer to another while retaining his user data and/or virtual changes. Most straightforwardly, the installation application may activate all layers stored to the device. Alternatively, the installation application may make selectable the stored layers, for example by a pop-up window (i.e. "which applications would you like to activate?") or by some configuration file or other element stored to the host or the portable storage device. Steps 1518 and 1520 specify one optional mode of operation, useful for providing for the default execution of an application contained in a layer stored on the portable device. In step 1518 the specified default application is executed or started. At some point, that application will terminate, in one example by a user commanded termination, as in step 1520. The termination of the application in that example is a signal to the system that the use of the enabled layer(s) is finished, and may be disabled, as in step 1522.

The triggering of the disablement of layers in step 1522 may be by other methods. For example, a layer may be automatically disabled if the user attempts to remove the media on which it is stored. Alternatively, the executable started in step 1518 might include a window, icon or other widget to signal termination of the use of the portable media device and layers stored thereon. Many other methods may be practiced in accordance with the planned use of the portable storage device and contents thereof.

Following disablement of all the enabled layers, the layering system drivers may optionally be un-installed as in step 1524. Following that step, the host system may be largely or entirely in the same state as it was prior to installation of the layered system drivers. To avoid data corruption or loss on the portable storage device, a message may be displayed in step 1526 informing the user that the device may safely be removed. The host system may then be used as before the storage device was inserted.

Now the construction of an auto-loading layered portable storage device as described above may be fashioned using the systems described throughout this application. More particularly, the "Example Implementation" above may be modified slightly for use on a Windows platform, for example by including the FSLX driver and FSLLIB32.DLL library to a portable storage device, and by creating an installation application as described above. Other auto-loading layered devices may be constructed for other operating systems, or for several operating systems for the same device, by following the principles given above and below.

Figure 9:
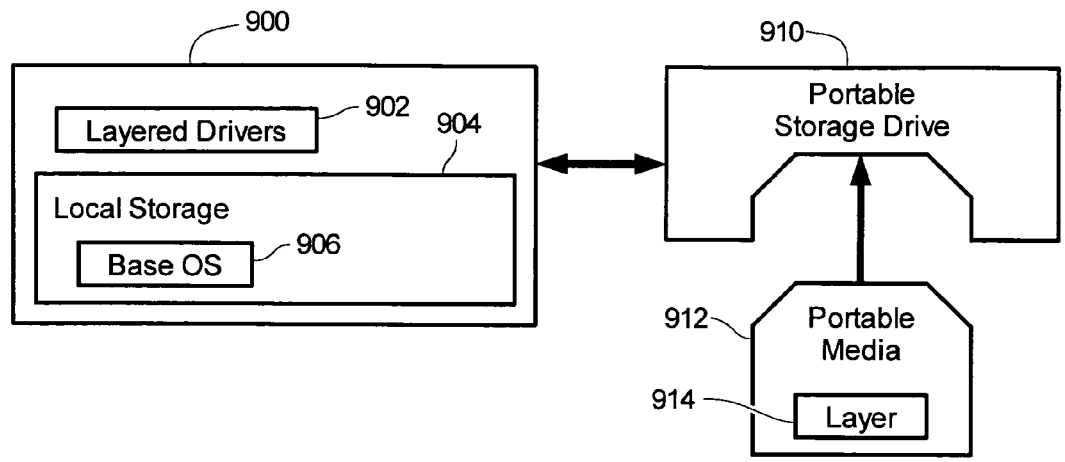
FIG. 9 illustrates a system for using a layered portable storage device.

A system for using a layered portable storage device is illustrated in FIG. 9. That system includes a host computer or computing device 900, which includes local storage 904, which is typically a hard drive. On local storage 904 is a base operating system 906, which includes basic facilities for accessing filesystems, executing applications and interacting with users. Host computing device 900 has installed thereon layered drivers providing file redirection and other layer support for enabled layers. Host computing device 900 has further attached or installed thereto a portable storage drive 910 permitting the connection of portable media devices 912 for at least reading and optionally writing. Portable storage drive 910 might take many forms, examples of which are flash memory readers, slots and interfaces, optical media drives, magnetic media drives and other drives which accept portable storage media of any kind. Portable media 912 may contain a layer 914, which might be for example an application layer containing an executable form of an application. Through layered drivers 902, the contents of layer 914 are made available to base operating system 906 and applications thereon.

The entire system of FIG. 9 may be used intermittently, i.e. although drivers 902 may be installed essentially permanently to host computer 900, they may remain inactive while a layer 914 is inaccessible, for example when there is no media in drive 910. Host computer 900 might operate to detect the presence of media 912 and a layer 914 thereon, an automatically enable that layer when it becomes accessible to the layered drivers 900 and host computer 900. When finished with layer 914, the layer may be disabled and media 912 ejected for later use.

If layer 914 is an application layer, that layer may contain an application installation, i.e. all necessary files and configuration to operate an application or application suite on a host computer 900 to which media 912 is connected. Media 912 may be carried to another host computing device, and there utilizing the contents of layer 914 and any applications therein.

Figure 15:
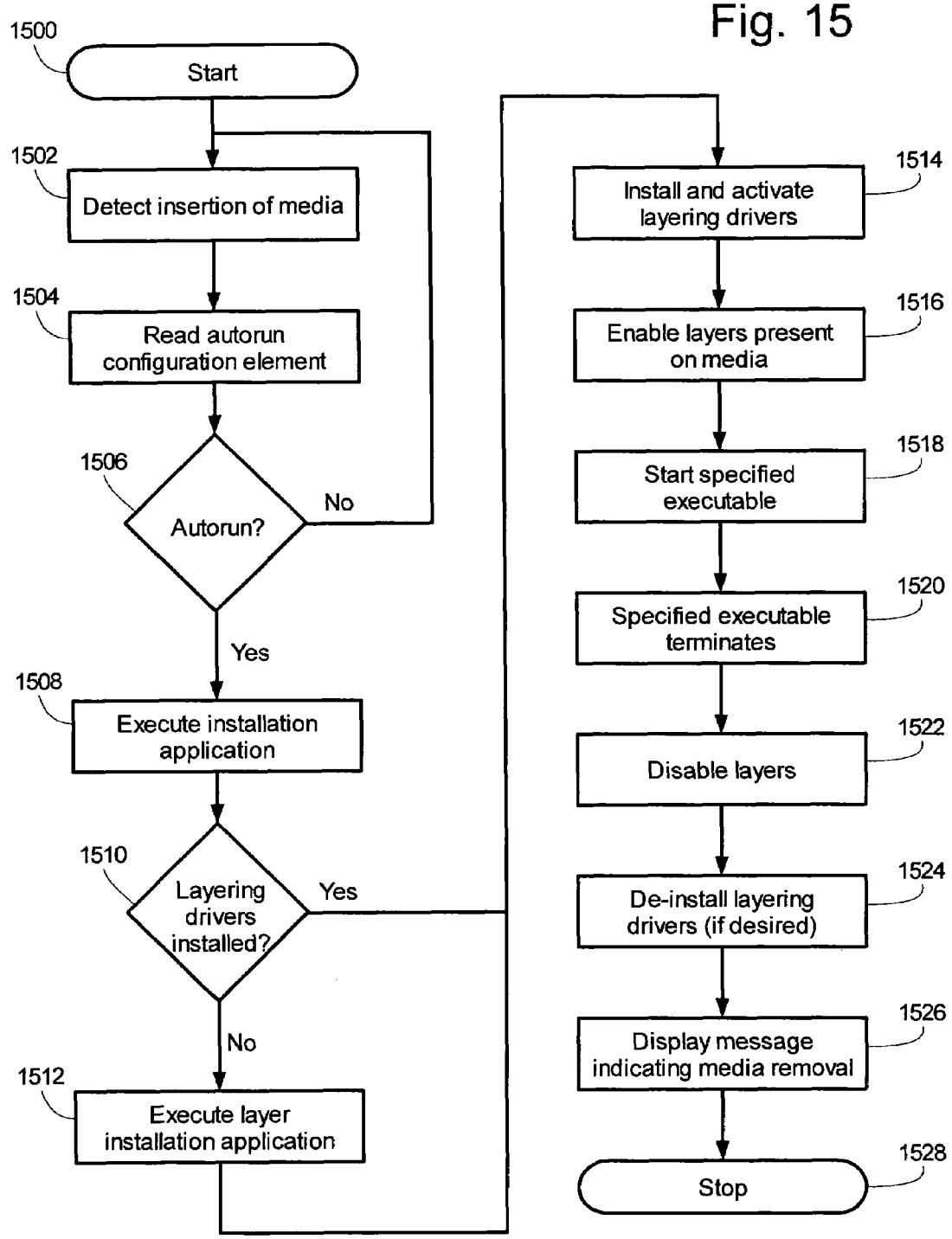
FIG. 15 illustrates a method of operation of a portable storage device containing layers, layered drivers and an autorun install application.

Layered drivers 902 may be installed as described in the method of FIG. 15, at the time media 912 becomes accessible to host computer 900, for example by way of an autorun install application. Layered drivers might also be installed separately to the host computer prior to the use of the application layer. This might be done, for example, to support a host computer that does not support an autorun procedure, or for a host computer that is to accept several portable storage devices with different layers stored thereon.

Creation of Layered Portable Storage Devices

The most straightforward way of creating a layered portable storage device is simply to place a layer on it. Drivers and a generic autorun installation script may also be placed on the storage device to automatically install those drivers and enable all layers stored to the device. A system may make use of any filesystem support for the particular storage device for the placement and access of a layer. Methods of creation that are more friendly to a user will now be described.

Referring first to FIG. 13A, a computing device 1300 is depicted having local storage 1304 on which a base operating system 1306 is installed. To facilitate compatibility, base OS 1306 may be of a type for which a newly created layer is to operate under, although it may be possible to use a similar operating system to detect the components of an installation. A display 1302 and an input device, not shown, may also be included to direct the several steps illustrated here. Layered drivers 1308 are installed to computing 1300, the drivers including functionality to conduct a capture operation. In this example, the capture operation will be a simple capture operation, without PID consideration, as described above.

FIG. 13b illustrates the state of computing device 1300 after a capture operation is started. Changes to locally maintained filesystems then become captured by layer drivers 1308 and directed to a new capture layer 1310. Referring now to FIG. 13c, computing device 1300 has attached a drive 1312, which in this example is a CD-ROM drive. Following the commencement of the capture operation, a software package 1314 is inserted to drive 1312. If software package 1314 includes an autorun program, and if computing device 1300 is configured to autorun, an installation application will be started. Otherwise a user may interact with the system in accordance with the application installation method prescribed by the software maker. As the installation application proceeds, file actions that would normally write to local storage are sent by the layered drivers 1308 to a capture layer 1310. Thus application files sourced from the software package media 1314 are deposited to layer 1310 rather than a local filesystem to computing device 1310. The application installation procedure is allowed to complete, with the user supplying any requested information or other interaction with the application installer. When the installation procedure is complete, a user terminates the capture mode leaving a full application installation captured to layer 1310. At this time a user may edit the newly created layer to remove any extraneous entries, for example entries to a particular user's profile or changes made to a temporary directory.

Having created a desired application layer, that layer is now ready for placement on a portable storage media device. Referring now to FIG. 13D, a portable media device 1316 is connected to computing device 1300 through an appropriate interface. Layered drivers 1308 receive application layer 1310 stored to computing device 1300 and perform any necessary conversions to an exportable format. The exported format is then saved to portable media device 1316 as exported layer 1318. It may be that under some circumstances little or no conversion will be required, particularly if layer 1310 is written to avoid references that relate to the placement of layer 1310 on the storage device or the contents thereof. In that case, layer 1310 might simply be copied to media device 1316. The format of an exported layer is not essential, as conversion might also be performed at the time layer 1318 is used. As described above, a layering driver package 1320 and an install executable 1322 may be stored to the media, if desired. Media device 1316 would then be ready for use.

The method just described is a simple method by which a user might create application layers, or layers having other contents, for his own use. In some circumstances it may be desirable to distribute layers to a group of users, or even publicly over a website. If so, a network system as that shown in FIG. 12 may be appropriate. In that example, a network web server 1200 is provided having a network interface 1204, which includes hardware and software to enable communication over network connection 1222. Server 1200 further includes storage 1202 on which is stored various objects that may be installed to a portable media device 1228, including an install application 1206, a driver package 1208, and layers 1210, 1212, 1214, 1216, 1218 and 1220. A user interacts with the system by way of a client computer 1224 also having a network interface 1226 for communicating over network 1222 with server 1200.

Figure 11A:
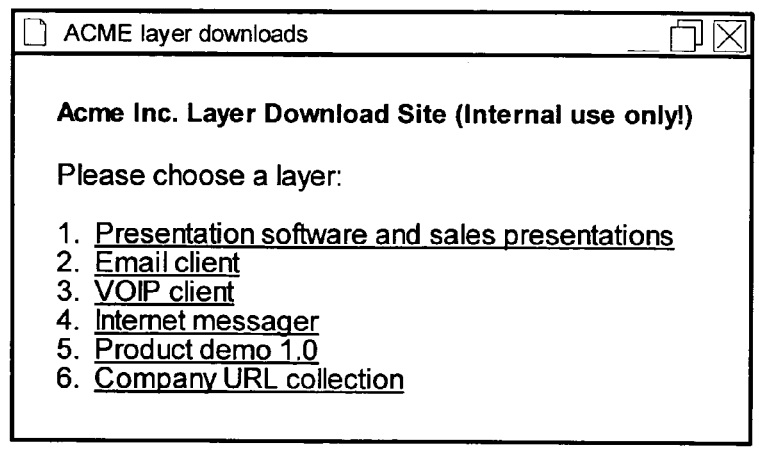

The method of interaction in this example is by way of a browser, FIGS. 11A, 11B, 11C, 11D and 11E representing several screens during that interaction. When first directed to server 1200 browser displays a first screen as depicted in FIG. 11A. In this example, server 1200 stores layers related to the business of "Acme. Inc.", which are made available to persons to the internal Acme local area network. In the first screen, the user interacting with the client 1224 is first requested to choose from a number of application layers. In this example, the layers relate to applications that a salesperson might want to take with him while travelling. The portable storage device 1228 will be used to carry applications to a potential customer's computer for execution, which might reduce the need for the salesperson to take a portable computer. In the first layer, presentation software is bundled with a number of sales presentations permitting presentation to a customer. In another layer, a software product demonstration is wrapped for demonstration at the customer's site. Likewise, other application layers have been made available for network communication, including an email, voice over IP (VOIP) and instant messenger application. A data layer containing a collection of handy URLs is also provided, in case the salesperson wants to direct the customer to information on the Internet. Many other layers might be created as desired.

The user clicks on one of the layer links, and the screen of FIG. 11B is presented, prompting the user to connect a memory card storage device to the computer, if the layer is to be destined for a memory card. Alternatively, the selected layer might be deposited to another location, such as a local hard drive or network drive location. FIG. 11C represents a screen for making such a selection, in this example made after the screen of FIG. 11B. The user picks a location, and clicks the "OK" button. A screen as depicted in FIG. 11D is displayed while objects stored in storage 1202 on server 1200 are transferred to the destination, for example 1228. A plug-in to the browser, for example a Java interpreter, may be taken advantage of to execute a program to install the selected objects to the destination. As depicted in FIG. 12, the installation of objects in this example involves copying an installation program 1206, driver package 1208 and the selected layer 1216 to storage device 1228 represented by 1230, 1232 and 1234. The copying of those objects results in a storage device 1228 similar to that shown in FIG. 10. Following the object installation, a screen as depicted in FIG. 11E may be displayed indicating the storage device may be removed and used.

A layer distribution system might also be used in a commercial setting, such as a kiosk environment. Depicted in FIG. 14A is a kiosk computing system that may be intended for a public location, such as an isle in a department store, usable by an ordinary person to load application layers to a portable storage device. The kiosk system includes a computing device 1400, a display output device 1402, storage 1404 and a user input device, such as a keyboard, not shown. Present on storage 1404 is a layering driver package 1408, a package installation program 1406, and several previously captured application layers 1410, 1412, 1414, 1416, 1418 and 1420. Computing device 1400 further includes a slot or socket 1421 for connecting a portable storage device. In the default state of the kiosk the display 1402 may offer a selection between the layers available on storage 1404, in this example by application name. A user makes a selection, and the kiosk presents a payment method screen as depicted in FIG. 14B. Following selection of a payment method, the kiosk takes additional steps, not shown, in order to receive sufficient payment. Once conditions of sufficient payment are met, the kiosk directs the user to insert the portable storage device into the slot, as depicted in FIG. 14C. The computing device 1400 may optionally auto-detect the connection of a storage device to socket 1421, in which case the operation shown in FIG. 14D commences.

In the operation shown in FIG. 14D, selected layer 1416 is copied to storage device 1422, the copy shown as 1428. Storage device 1430 includes a previously written layer 1430, which may be left intact provided that sufficient space is available on storage device 1422 for both the new and old layers. Installation application 1406 and driver package 1408 may also be written to storage device 1422, particularly if those components have not previously been written. The resulting portable storage device includes at least one layer 1428, and may also include installation application 1406 and driver package 1426, particularly if the intended operating system does not support layered access by default.

While the present systems and methods have been described and illustrated in conjunction with a number of specific configurations, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. A system for interaction with a portable data storage device containing an application layer comprising:

non-volatile memory medium contained in a portable storage container;
a host computing device, said host computing device including a local memory;
an interface for accessing said non-volatile memory by said host computing device;
at least one application layer stored to said non-volatile memory, said application layer including an executable form of an application;
computer instructions stored either in said non-volatile memory or said local memory for operating a layered computing environment, said computer instructions executable by said host computing system to achieve the functions of:
(i) receiving from applications a read request for a read operation to a file system, the read request containing a file reference appropriate to the file system organization;
(ii) for file references of the received read requests, attempting to identify an owner layer for a set of layers enabled on the host computing device, wherein said attempting identifies an owner layer from enabled layers found to have a virtual object corresponding to the file reference, if at least one enabled layer having such a virtual object is found;
(iii) if, for a particular read request, an owner layer is identified for a file reference, identifying a virtual read reference corresponding to the read reference of the particular read request utilizing information contained in the identified owner layer,
(iv) following the identifying a virtual read reference, causing a read operation to execute using that virtual read reference,
(v) if, for a particular read request, an owner layer is not identified for a file reference, causing the read operation to execute using the file reference of the particular read request.

2. A system according to claim 1, wherein said non-volatile memory further contains layered system drivers.

3. A system according to claim 2, wherein said non-volatile memory further contains computer executable instructions for installing said layered system drivers to said host computing device.

4. A system according to claim 1, wherein said computer instructions are further executable by said host computing system to achieve the functions of:
(vi) examining the layers installed to a computer system for a configuration element, that element specifying for each layer whether or not the layer is to be enabled on system initialization; and
(vii) enabling those layers having configuration elements specifying layer enablement on system initialization.

5. A portable data storage device for presenting an application layer to a host computing device, comprising:
a non-volatile memory medium contained in a portable storage container;
an interface for accessing said non-volatile memory by a host computing device;
at least one application layer stored to said non-volatile memory, said application layer including an executable form of an application;
layered system driver computer instructions stored in said non-volatile memory for operating a layered computing environment, said computer instructions executable by the host computing system to achieve the functions of:
(i) receiving from applications a read request for a read operation to a file system, the read request containing a file reference appropriate to the file system organization;
(ii) for file references of the received read requests, attempting to identify an owner layer for a set of layers enabled on the host computing device, wherein said attempting identifies an owner layer from enabled layers found to have a virtual object corresponding to the file reference, if at least one enabled layer having such a virtual object is found;
(iii) if, for a particular read request, an owner layer is identified for a file reference, identifying a virtual read reference corresponding to the read reference of the particular read request utilizing information contained in the identified owner layer,
(iv) following the identifying a virtual read reference, causing a read operation to execute using that virtual read reference,
(v) if, for a particular read request, an owner layer is not identified for a file reference, causing the read operation to execute using the file reference of the particular read request; and installation computer instructions stored in said non-volatile memory for operating a layered computing environment, said computer instructions executable by the host computing system to install said layered system driver computer instructions to the host computing system.

6. A portable data storage device according to claim 5, wherein said installation computer instructions are further configured to be automatically executed on connection of said portable storage device to the host computing system.

7. A portable data storage device according to claim 5, wherein said installation computer instructions are further configured to be executed by user interaction from the host computing system.

8. A portable data storage device according to claim 5, wherein said layered system driver computer instructions are further executable by the host computing system to achieve the functions of:
(vi) receiving from applications write requests for write operations to a file system, each write request containing a file reference appropriate to a file system organization;
(vii) for file references of particular received write requests, determining if the write request is to be captured to an enabled layer, and if the write request is to be captured, attempting to identify an owner layer from a set of currently enabled layers,
(viii) if, for a particular write request, an owner layer is identified for the file reference of that write request, identifying a virtual write reference utilizing information contained in the identified owner layer, the virtual write reference corresponding to the file reference of the particular write request,
(ix) following the identifying a virtual write reference, causing a write operation to execute using that virtual write reference,
(x) if, for a particular write reference, an owner layer is not identified for the file reference of that write request, causing a write operation to execute using the file reference of the particular write request.

9. A portable data storage device according to claim 8, wherein said layered system driver computer instructions are further executable by the host computing system to achieve the functions of:
(xi) receiving from applications requests to create, delete, and set the value of a registry setting;
(xii) following receipt of a request to create, delete or set the value of a registry setting, a determining whether or not the registry operation of the request is to be captured to an enabled layer;

(xiii) acting on a request to create a registry setting, and on a determination that a registry setting is not to be captured to an enabled layer, causing the registry setting operation to execute in the base system registry location;
(xiv) acting on a request to create a registry setting, and on a determination that a registry setting is to be captured to an enabled layer, identifying a registry creation destination layer;
(xv) following said identifying a registry creation destination layer, causing the registry setting to be created virtually in the registry creation destination layer;
(xvi) acting on a request to delete a registry setting, and on a determination that a registry setting is not to be captured to an enabled layer, causing the registry setting deletion operation to execute in the base system registry location;
(xvii) acting on a request to delete a registry setting, and on a determination that a registry setting is to be captured to an enabled layer, identifying a registry deletion destination layer;
(xviii) following said identifying a registry deletion destination layer, causing the registry setting to be deleted virtually in the registry deletion destination layer;
(xix) acting on a request to set a registry setting, and on a determination that a registry setting is not to be captured to an enabled layer, causing the registry setting operation to execute in the base system registry location;
(xx) acting on a request to set a registry setting, and on a determination that a registry setting is to be captured to an enabled layer, identifying a registry setting destination layer; and
(xxi) following said identifying a registry setting destination layer, causing the registry setting to be created virtually in the registry setting destination layer.

10. A portable data storage device according to claim 5, wherein said installation computer instructions are further configured to be automatically executed on connection of said portable storage device to the host computing system.

11. A portable data storage device according to claim 5, wherein said installation computer instructions are further configured to present a user selection of layers to enable.

12. A portable data storage device according to claim 5, wherein said installation computer instructions are further configured to disable application layers previously enabled.

13. A portable data storage device according to claim 5, wherein said installation computer instructions are further configured to uninstall the layered system driver computer instructions.

14. A method of creating a portable data storage device for presenting an application layer to a host computing device, the portable data storage device including non-volatile random access memory encapsulated in a portable storage container, said portable data storage device further incorporating an interface for accessing said non-volatile memory by a host computing device,
said method comprising the steps of:
providing a host computing device, the host computing device including an interface functional to access a non-volatile memory medium, the host computing device further including an input and an output device;
providing storage accessible to the host computing device having stored thereon at least one application layer, each of the application layers including an executable form of an application;
offering a selection between the application layers stored on the storage by way of the output device of the host computing device;
accepting a selection for an application layer by way of the input device;
connecting to a non-volatile memory medium contained in a portable storage container;
depositing the application layer indicated by the selection made in said accepting to the memory medium;
placing layered computer instructions either ill the non-volatile memory or the local memory of an application executing computing device, the computer instructions executable by the application executing computing device to achieve the functions of:
(i) receiving from applications a read request for a read operation to a file system, the read request containing a file reference appropriate to the file system organization;
(ii) for file references of the received read requests, attempting to identify an owner layer for a set of layers enabled on the host computing device, wherein said attempting identifies an owner layer from enabled layers found to have a virtual object corresponding to the file reference, if at least one enabled layer having such a virtual object is found;
(iii) if, for a particular read request, an owner layer is identified for a file reference, identifying a virtual read reference corresponding to the read reference of the particular read request utilizing information contained in the identified owner layer,
(iv) following the identifying a virtual read reference, causing a read operation to execute using that virtual read reference,
(v) if, for a particular read request, an owner layer is not identified for a file reference, causing the read operation to execute using the file reference of the particular read request; and
enabling the application layer deposited to the memory medium.

15. The method of claim 14, further comprising the step of executing the executable form of an application stored in the application layer deposited to the memory medium.

16. A method according to claim 14, further comprising the step of depositing installation computer executable instructions to the memory medium, the installation computer executable instructions being executable by the application executing computing device to install the layered computer instructions to the application executing computing device.

17. A method according to claim 14, wherein layered computer instructions are placed in the nonvolatile memory.

* * * * *

UNITED STATES PATENT AND TRADEMARK OFFICE
CERTIFICATE OF CORRECTION

PATENT NO.       : 7,620,956 B2                                    Page 1 of 1
APPLICATION NO.  : 11/026520
DATED            : November 17, 2009
INVENTOR(S)      : Cook et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Twenty-sixth Day of October, 2010

David J. Kappos
*Director of the United States Patent and Trademark Office*